United States Patent
Yerramalli et al.

(10) Patent No.: US 11,863,501 B2
(45) Date of Patent: Jan. 2, 2024

(54) FRAME STRUCTURE FOR CONTROL SIGNALING INSTANCES

(71) Applicant: QUALCOMM Incorporated, San Diego, CA (US)

(72) Inventors: Srinivas Yerramalli, San Diego, CA (US); Chih-Hao Liu, San Diego, CA (US); Tamer Kadous, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/655,095

(22) Filed: Oct. 16, 2019

(65) Prior Publication Data
US 2020/0052870 A1   Feb. 13, 2020

Related U.S. Application Data

(62) Division of application No. 15/991,829, filed on May 29, 2018, now Pat. No. 11,025,403.
(Continued)

(51) Int. Cl.
*H04L 5/14* (2006.01)
*H04L 5/00* (2006.01)
(Continued)

(52) U.S. Cl.
CPC .......... *H04L 5/1438* (2013.01); *H04L 1/0038* (2013.01); *H04L 1/0045* (2013.01);
(Continued)

(58) Field of Classification Search
CPC ... H04L 5/1438; H04L 5/0003; H04L 5/0078; H04L 5/001; H04L 5/0094; H04L 5/1469;
(Continued)

(56) References Cited

U.S. PATENT DOCUMENTS 9,930,678 B2    3/2018  Kumar et al.
10,149,308 B2 *  12/2018  Cui ........................ H04L 5/0073
(Continued)

FOREIGN PATENT DOCUMENTS

CN    104348579 A    2/2015
CN    105188140 A    12/2015
(Continued)

OTHER PUBLICATIONS

International Search Report and Written Opinion—PCT/US2018/035105—ISA/EPO—dated Nov. 26, 2018.
(Continued)

*Primary Examiner* — Tejis Daya
(74) *Attorney, Agent, or Firm* — Procopio, Cory, Hargreaves & Savitch LLP

(57) ABSTRACT

A method, an apparatus, and a computer program for wireless communication that allows for greater scheduling flexibility of physical resources are disclosed. A UE determines a time division duplex (TDD) frame structure for a plurality of frames, where the plurality of frames include a plurality of uplink (UL) subframes and a plurality of downlink (DL) subframes. The UE determines whether a control signaling instance is scheduled during an UL subframe of the plurality of UL subframes, wherein the control signaling instance is scheduled periodically and the control signaling includes at least one of a random access channel, an uplink control channel, a sounding reference signal (SRS), or a scheduling request (SR). The UE communicates the control signaling instance if the control signaling instance is scheduled during an UL subframe.

19 Claims, 12 Drawing Sheets

Related U.S. Application Data

(60) Provisional application No. 62/531,837, filed on Jul. 12, 2017.

(51) Int. Cl.
  *H04L 1/00*     (2006.01)
  *H04W 72/23*    (2023.01)
  *H04W 72/0446*  (2023.01)

(52) U.S. Cl.
  CPC ............ *H04L 1/0072* (2013.01); *H04L 5/001* (2013.01); *H04L 5/0003* (2013.01); *H04L 5/0057* (2013.01); *H04L 5/0078* (2013.01); *H04L 5/0094* (2013.01); *H04L 5/1469* (2013.01); *H04L 5/005* (2013.01); *H04L 5/0048* (2013.01); *H04L 5/0051* (2013.01); *H04L 5/0053* (2013.01); *H04W 72/0446* (2013.01); *H04W 72/23* (2023.01)

(58) Field of Classification Search
  CPC ... H04L 1/0072; H04L 1/0045; H04L 1/0038; H04L 5/0057; H04L 5/0051; H04L 5/0053; H04L 5/005; H04L 5/0048; H04W 72/042; H04W 72/0446
  See application file for complete search history.

(56) References Cited

U.S. PATENT DOCUMENTS

| | | | |
|---|---|---|---|
| 2009/0046649 A1* | 2/2009 | Gao | H04L 1/1861 370/329 |
| 2009/0181689 A1* | 7/2009 | Lee | H04L 5/0044 455/450 |
| 2010/0080139 A1 | 4/2010 | Palanki et al. | |
| 2010/0165931 A1* | 7/2010 | Nimbalker | H04L 1/1671 370/329 |
| 2012/0099491 A1* | 4/2012 | Lee | H04L 5/0053 370/280 |
| 2012/0122472 A1* | 5/2012 | Krishnamurthy | H04L 27/0012 455/456.1 |
| 2012/0320805 A1* | 12/2012 | Yang | H04L 1/1861 370/280 |
| 2012/0320806 A1 | 12/2012 | Ji et al. | |
| 2013/0016706 A1* | 1/2013 | Axelsson | H04L 5/0037 370/336 |
| 2013/0021989 A1 | 1/2013 | Tiirola et al. | |
| 2013/0058285 A1 | 3/2013 | Koivisto et al. | |
| 2013/0208710 A1* | 8/2013 | Seo | H04L 5/0048 370/336 |
| 2013/0322307 A1* | 12/2013 | Yang | H04L 5/0055 370/280 |
| 2014/0029490 A1 | 1/2014 | Kim et al. | |
| 2014/0029563 A1* | 1/2014 | Kim | H04W 72/10 370/329 |
| 2014/0086112 A1* | 3/2014 | Stern-Berkowitz | H04L 5/14 370/280 |
| 2014/0092787 A1* | 4/2014 | Han | H04W 24/02 370/280 |
| 2014/0092794 A1* | 4/2014 | Yang | H04B 7/2656 370/280 |
| 2014/0112216 A1* | 4/2014 | Seo | H04L 5/0032 370/280 |
| 2014/0269451 A1* | 9/2014 | Papasakellariou | H04B 7/2656 370/280 |
| 2014/0269452 A1 | 9/2014 | Papasakellariou | |
| 2014/0269460 A1* | 9/2014 | Papasakellariou | H04L 5/0053 370/294 |
| 2014/0293842 A1* | 10/2014 | He | H04N 21/8456 370/280 |
| 2014/0293843 A1* | 10/2014 | Papasakellariou | H04L 1/00 370/280 |
| 2014/0301330 A1 | 10/2014 | Lee et al. | |
| 2014/0307652 A1* | 10/2014 | Zhang | H04L 5/0092 370/329 |
| 2014/0341126 A1* | 11/2014 | Piipponen | H04L 5/001 370/329 |
| 2015/0003360 A1 | 1/2015 | Liu et al. | |
| 2015/0124729 A1 | 5/2015 | Lee et al. | |
| 2015/0163022 A1* | 6/2015 | Johansson | H04L 5/0055 370/329 |
| 2015/0173102 A1 | 6/2015 | Ruiz et al. | |
| 2015/0195063 A1* | 7/2015 | Ro | H04L 5/0048 370/329 |
| 2015/0327263 A1* | 11/2015 | Chen | H04W 16/14 370/280 |
| 2015/0334741 A1* | 11/2015 | Yang | H04W 72/0413 370/329 |
| 2015/0358986 A1* | 12/2015 | Yang | H04L 1/1812 370/280 |
| 2015/0365924 A1 | 12/2015 | Gao et al. | |
| 2016/0037492 A1 | 2/2016 | Xu et al. | |
| 2016/0150508 A1* | 5/2016 | Golitschek Edler von Elbwart | H04L 5/0048 370/329 |
| 2016/0150539 A1 | 5/2016 | Xu et al. | |
| 2016/0182209 A1 | 6/2016 | Li et al. | |
| 2016/0242203 A1 | 8/2016 | You et al. | |
| 2016/0249331 A1 | 8/2016 | Park et al. | |
| 2016/0278118 A1 | 9/2016 | Yerramalli et al. | |
| 2017/0094642 A1 | 3/2017 | Lee et al. | |
| 2018/0019857 A1 | 1/2018 | Kazmi et al. | |
| 2018/0270026 A1* | 9/2018 | Lee | H04L 1/1864 |
| 2019/0020461 A1 | 1/2019 | Yerramalli et al. | |
| 2019/0074953 A1 | 3/2019 | Tooher et al. | |
| 2020/0280337 A1* | 9/2020 | Yi | H04L 5/001 |

FOREIGN PATENT DOCUMENTS

| | | | | |
|---|---|---|---|---|
| CN | 105409314 A | 3/2016 | | |
| CN | 105453689 A | 3/2016 | | |
| CN | 106063322 A | 10/2016 | | |
| CN | 106685581 A | 5/2017 | | |
| EP | 3200382 A2 | 8/2017 | | |
| TW | 201714465 A | 4/2017 | | |
| WO | WO-2013042991 A * | 3/2013 | ........... H04L 1/0027 |
| WO | WO-2013178187 A2 * | 12/2013 | ............... H04L 5/14 |
| WO | 2014015266 A2 | 1/2014 | | |
| WO | 2016048111 A2 | 3/2016 | | |

OTHER PUBLICATIONS

Partial International Search Report—PCT/US2018/035105—ISA/EPO—dated Sep. 10, 2018.
Research in Motion., et al: "PDCCH Enhancement in Rel-11 Carrier Aggregation", 3GPP Draft; R1-112376_PDCCH_DCI_V2, 3rd Generation Partnership Project (3GPP), val. Ran WG1, Athens, Greece, Aug. 16, 2011, pp. 1-3.
European Search Report—EP20181763—Search Authority—Munich—dated Oct. 12, 2020.
Taiwan Search Report—TW107118437—TIPO—dated Jun. 30, 2021.
Taiwan Search Report—TW107118437—TIPO—dated Oct. 22, 2021.
Taiwan Search Report—TW110148111—TIPO—dated Jun. 6, 2022.
Taiwan Search Report—TW110148111—TIPO—dated Sep. 20, 2022.
Ericsson: "Miscellaneous feMTC Corrections and Clarifications Resulting from ASN.1 Review", 3GPP TSG-RAN WG2 Meeting #98, 36331_CR2870R2_(REL-14)_R2-1706186, 3rd Generation Partnership Project, Mobile Competence Centre, 650, Route Des Lucioles, F-06921 Sophia-Antipolis Cedex, France, vol. Ran WG2, No. Hangzhou, China, May 15, 2017-May 19, 2017, Jun. 5, 2017, XP051279776, 71 Pages, SkipUplinkDynamic, p. 64, SkipUplinkSPS, p. 64.

(56) References Cited

OTHER PUBLICATIONS

European Search Report—EP22192158—Search Authority—The Hague—dated Jan. 10, 2023.

* cited by examiner

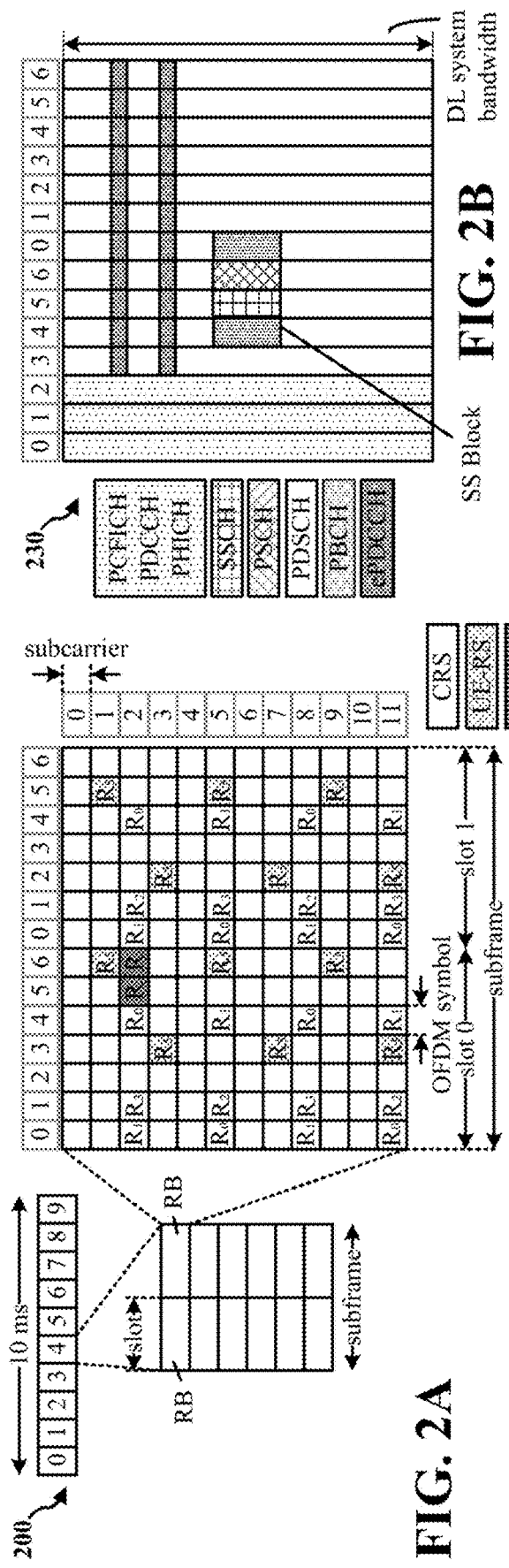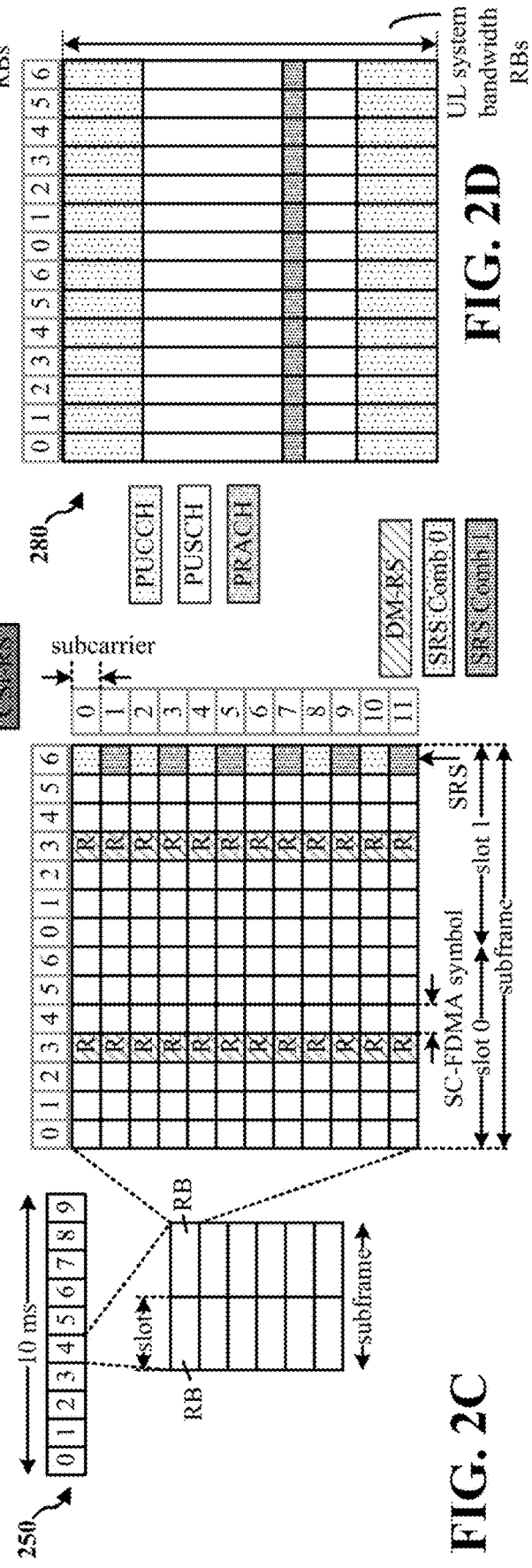

FRAME STRUCTURE FOR CONTROL SIGNALING INSTANCES

CROSS-REFERENCE TO RELATED APPLICATIONS(S)

This application is a divisional of U.S. patent application Ser. No. 15/991,829, entitled "FRAME STRUCTURE DEPENDENT CONFIGURATION OF PHYSICAL CHANNELS" and filed May 29, 2018, which claims the benefit of U.S. Provisional Patent Application Ser. No. 62/531,837, entitled "FRAME STRUCTURE DEPENDENT CONFIGURATION OF PHYSICAL CHANNELS" and filed on Jul. 12, 2017, which is expressly incorporated by reference herein in its entirety.

BACKGROUND

Field

The present disclosure relates generally to communication systems, and more particularly, to the allocation of physical downlink and uplink resources.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

In telecommunication standards, such as LTE and 5G NR, wireless communication systems allocate physical resources to establish communication links that allow for telecommunication services to be provided to user equipment (UE) with a base station. Therefore, there is a need for systems and techniques that improve the efficiency and increase the flexibility in which wireless communication systems allocate physical resources.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Transmissions between user equipment and base stations in a wireless communication system are generally organized into frames, which are themselves organized into sets of subframes (as further detailed below). A time division duplex (TDD) frame structure can be provided which designates subframes as either downlink (DL) subframes (in which a base station transmits information to the UE) or uplink (UL) subframes (in which a UE transmits information to the base station). While frame structures in some telecommunication standards (e.g., LTE) are static with regards to the assignment of subframes as either DL or UL, other telecommunication standards are more dynamic in that subframes for data can be designated as either DL or UL. However, with respect to the allocation of physical (PHY) layer resources related to synchronization, control, system information, and other non-data information, there may not be much flexibility.

In LTE, frame structures allocate physical resources for UL and DL at fixed subframe positions. For example, the configuration of PHY layer UL resources for physical random access channel (PRACH), physical uplink control channel (PUCCH), sounding reference signals (SRS), or scheduling request (SR) resources is a function of the frame structure and is fixed once the choice of frame structure is made. Other telecommunication standards (e.g., LTE enhanced Interference Mitigation and Traffic Adaptation (eIMTA)) may allow the frame structure to change dynamically, but a common set of resources across different configurations may still be required for PRACH, PUCCH, etc. In LTE Licensed Assisted Access (LAA), while the frame structure may be dynamic and the location of resources may change with the frame structure, the resource configuration for PUCCH may be fixed to certain types of subframe. Other systems such as enhanced Machine Type Communication (eMTC or LTE-M), Narrowband IoT (NB-IoT), and Listen Before Talk (LBT) have more flexible frame structures but may still require a minimum number of guaranteed DL subframes and minimum number of guaranteed UL subframes in which physical DL resources and physical uplink resources for non-data transmissions must be provided. The use of guaranteed DL and UL subframes limits scheduling flexibility for physical resources since only these subframes can be used for non-data transmissions. The use of guaranteed DL and UL subframes also make it more difficult to allocate physical resources when theses physical resources are shared among various UEs since the assignment of physical downlink control channel (PDCCH), PUCCH, and other non-data information for the various UEs are limited to the guaranteed DL and UL subframes.

This disclosure describes systems and techniques in which physical resources for non-data information are allocated in a flexible manner into subframes as a function of a TDD frame structure. In this manner, the number of DL subframes and UL subframes in a set of frames may be flexibly assigned. Physical resources for non-data information may be assigned to any of the DL subframes (for physical DL resources) or UL subframes (for physical UL resources) available rather than being restricted to a limited set of guaranteed DL or UL subframes. A UE may receive information about the frame structure of the set of frames from a base station to determine the size and location of DL subframes and UL subframes. The systems and techniques also make it easier to allocate shared physical resources since physical resources can be distributed within a greater range of subframes within the frames.

In an aspect of the disclosure, a method, a computer-readable medium, and an apparatus for wireless communication are provided in which information is received by a UE from a base station. The received information indicates a TDD frame structure of a plurality of frames. The plurality of frames includes a plurality of subframes. The UE may determine a control channel search space within the plurality of subframes based on the received information about the TDD frame structure of the plurality of frames. The UE may also determine a search strategy including a maximum aggregation level based on the control channel search space. The UE may perform a blind decoding of the control channel search space with the search strategy to obtain control information.

In another aspect of the disclosure, a method, a computer-readable medium, and an apparatus for wireless communication are provided in which a UE determines a TDD frame structure of a plurality of frames. A plurality of UL subframes of the plurality of frames assigned for transmitting UL resources associated with a control signaling is a function of the TDD frame structure. The UE may determine a location of a scheduled UL resource within the TDD frame structure for communicating one of a number of types of the control signaling. The type of control signaling includes at least one of PRACH, PUCCH, SRS, or SR. The UE may determine if the location of the scheduled UL resource for communicating a type of the control signaling occurs on one of the plurality of UL subframes assigned for transmitting the scheduled UL resource. If it is, the UE may communicate the type of the control signaling using the scheduled UL resource over one of the plurality of UL subframes.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a DL frame structure, DL channels within the DL frame structure, an UL frame structure, and UL channels within the UL frame structure, respectively.

DETAILED DESCRIPTION

Figure 1:
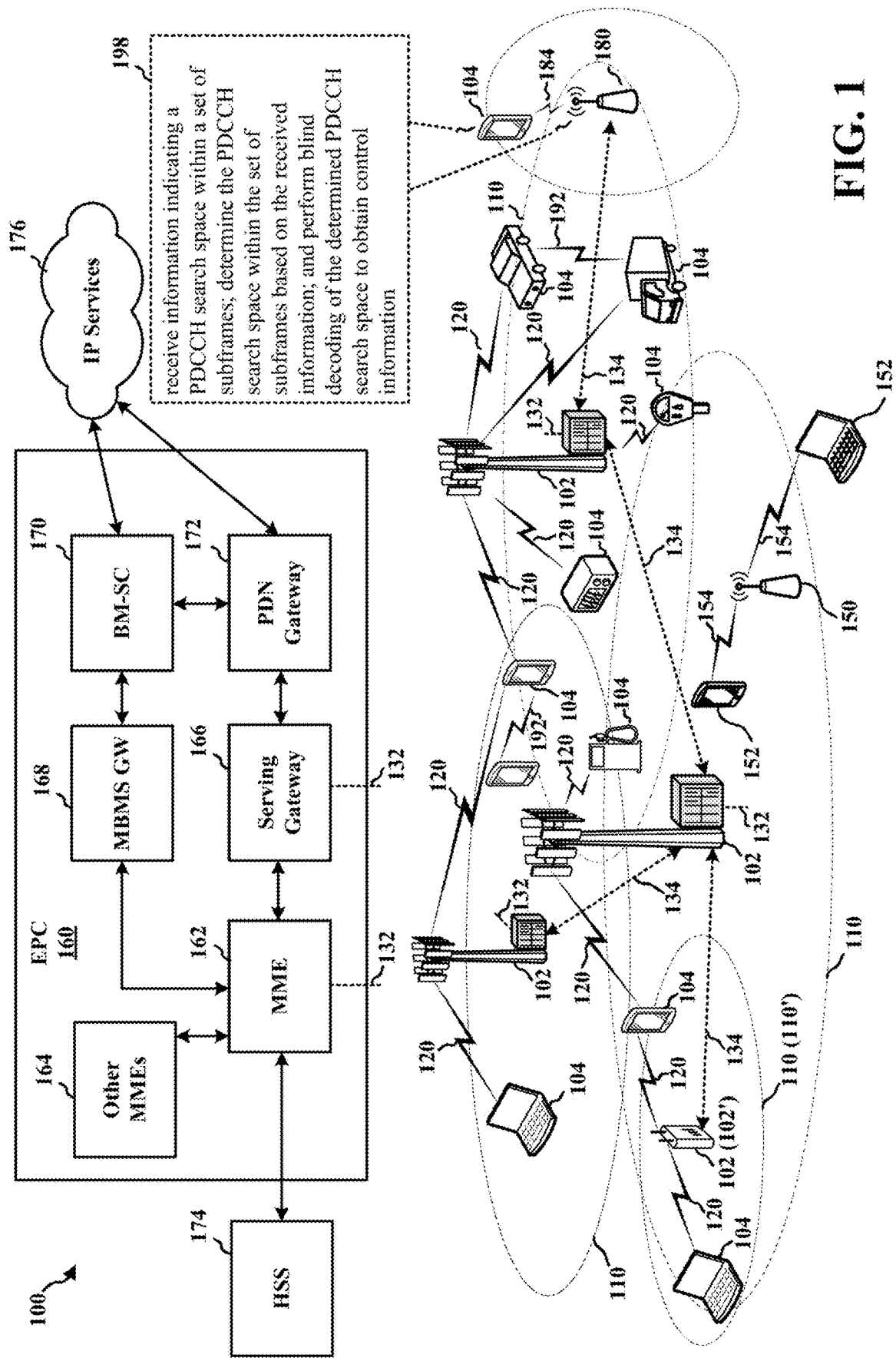
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In LTE, the allocation of physical resources (e.g., PRACH, PUCCH, SRS, SR) are fixed once the TDD frame structure is finalized. Thus, physical resources are always maintained in particular subframe temporal positions in LTE. With regards to LTE eIMTA and LAA, the TDD frame structure can change dynamically. Nevertheless, a least common set of resources is defined in eIMTA for the allocation of physical resources (e.g., ePRACH, PUCCH, SRS, SR) across different frame configurations. In LTE LAA, the TDD frame structure can change dynamically and floats in time, however certain physical resources have fixed configurations. For example, a short PUCCH (sPUCCH) configuration may be fixed in LTE LAA but allowed to float temporally. However, even in this case, the sPUCCH location starts and ends in subframes subject to a transmit opportunity (TxOP) time limit.

For eMTC-Uplink (eMTC-U) and NB-IoT-Uplink (NB-IoT-U), there has been some discussion of having a dynamic type TDD frame structure with a self-contained transmission framework. Nevertheless, the DL-UL transaction in eMTC-Uplink (eMTC-U) and NB-IoT-Uplink (NB-IoT-U) are completed within a TxOP (or a few TxOPs) and the DL transaction is always within one TxOP. As such, TDD frame structures have previously defined minimum guaranteed DL subframes for the allocation of physical DL resources and minimum guaranteed UL subframes for the allocation physical UL resources.

In this disclosure however, frame structure dependent resource configurations are disclosed that enable a higher scheduling flexibility at a minimal increase in configuration complexity. These solutions even lead to UE power savings depending on configuration settings.

Referring again to FIG. 1, in certain aspects (see element 198), the UE 104 may be configured to receive information from the base station 180. In the DL, the base station 180 may provide header compression, ciphering, packet segmentation and reordering, multiplexing between logical and transport channels, and radio resource allocations to the UE. In this example, the information may indicate at least one of a location or a size of a PDCCH search space within a set of subframes of a set of frames. The location and/or the size of the PDCCH search space is a function of a TDD frame structure of the set of frames. In one aspect, the information may indicate the structure of the TDD frames in the set of frames. The UE may use this information to determine the location and size of a PDCCH search space within a set of subframes of the set of frames. For example, the information may indicate the number of DL frames or the number of DL subframes in the set of frames. Based on this information, the UE may determine the location and size of the PDCCH search space within the DL subframes in the set of frames.

For instance, the information may be broadcast in a physical DL channel, such as the physical broadcast channel (PBCH), and be provided as information within a master information block (MIB) or a system information block (SIB). The control information for the UE 104, such as a common PDCCH or a UE specific PDCCH, may be within a set of DL subframes in the set of frames. The UE 104 may perform a blind search to find its control information in the DL subframes that make up the PDCCH search space.

As such, the UE 104 determines the PDCCH search space within the set of DL subframes based on the received information indicating the location and/or the size of the PDCCH search space or based on the received information indicating the structure of the TDD frames in the set of frames. To obtain the control information for the UE 104, the UE 104 may perform a blind decoding or blind search of the determined PDCCH search space to obtain the control information. In one example, the UE 104 may decode PDCCH candidates in the PDCCH search space until the UE 104 finds a common PDCCH or a UE specific PDCCH. The UE 104 may obtain the control information from the common PDCCH or the UE specific PDCCH to obtain control information which may include, for example, information regarding physical UL resource allocations.

In another aspect of the disclosure, the UE 104 may be configured to determine a TDD frame structure. The UE 104 may use the TDD frame structure to determine UL resources for the transmission of non-data information. For example, the UE 104 may receive information on the TDD frame structure on the common PDCCH or UE specific PDCCH. In one aspect, the UE 104 may receive information on the TDD frame structure through the PBCH, the MIB, or the SIB. The UE 104 may then use the information about the TDD frame structure to determine various physical resources available within UL subframes in the set of frames. For example, the UE 104 may receive information indicating the number of DL frames, the number of DL subframes, the number of UL frames, or the number of UL subframes in the set of frames. Based on this information, the UE 104 may determine the location and size of the UL subframes in the set of frames. In this manner, the UE 104 may determine a location of at least one of a PRACH, a PUCCH, SRS, or SR resources based on the determined TDD frame structure. The UE 104 may then transmit at least one of the PRACH, the PUCCH, the SRS, the SR resources, or the measurements of a positioning reference signal (PRS) based on the determined location for the at least one of the PRACH, the PUCCH, the SRS, or the SR resources.

In yet another aspect of the disclosure, the UE 104 may be configured to determine a TDD frame structure. The UE 104 may use the TDD frame structure to determine DL resources for the measurement of channel quality and UL resources for the transmission of measurement of the channel quality. For example, the UE 104 may receive information on the TDD frame structure through the common PDCCH or UE specific PDCCH. In one aspect, the UE 104 may receive information on the TDD frame structure through the PBCH, the MIB, or the SIB. The UE 104 may then use the information about the TDD frame structure to determine the location and size of DL subframes and UL subframes in the set of frames. The UE 104 is then configured to determine a number of the DL subframes over which to measure, and to average, a channel quality based on the determined TDD frame structure, and to send, over a number of the UL subframes, a channel quality indicator (CQI) measured over the determined number of subframes.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH occupies the 1, 2, or 3 symbols at the beginning of each subframe as indicated by the PCFICH. The PDCCH carries downlink control information (DCI) within one or more control channel elements (CCEs), each CCE including nine RE groups (REGs), distributed across the first 1, 2, or 3 symbols of each subframe, each REG including four consecutive REs in an OFDM symbol. The number of CCEs in a PDCCH is called an aggregation level, and may be 1, 2, 4, 8, or 16 consecutive CCEs. For example, a PDCCH with an aggregation level of 8 may use a CCE at the first 1, 2, or 3 symbols of each of 8 consecutive subframes. A PDCCH with an aggregation level of n may only start on a boundary of every n subframes. For example, in the example of the PDCCH with an aggregation level of 8, the PDCCH may only start on subframe 0, 8, 16, etc. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH).

The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a CQI, a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
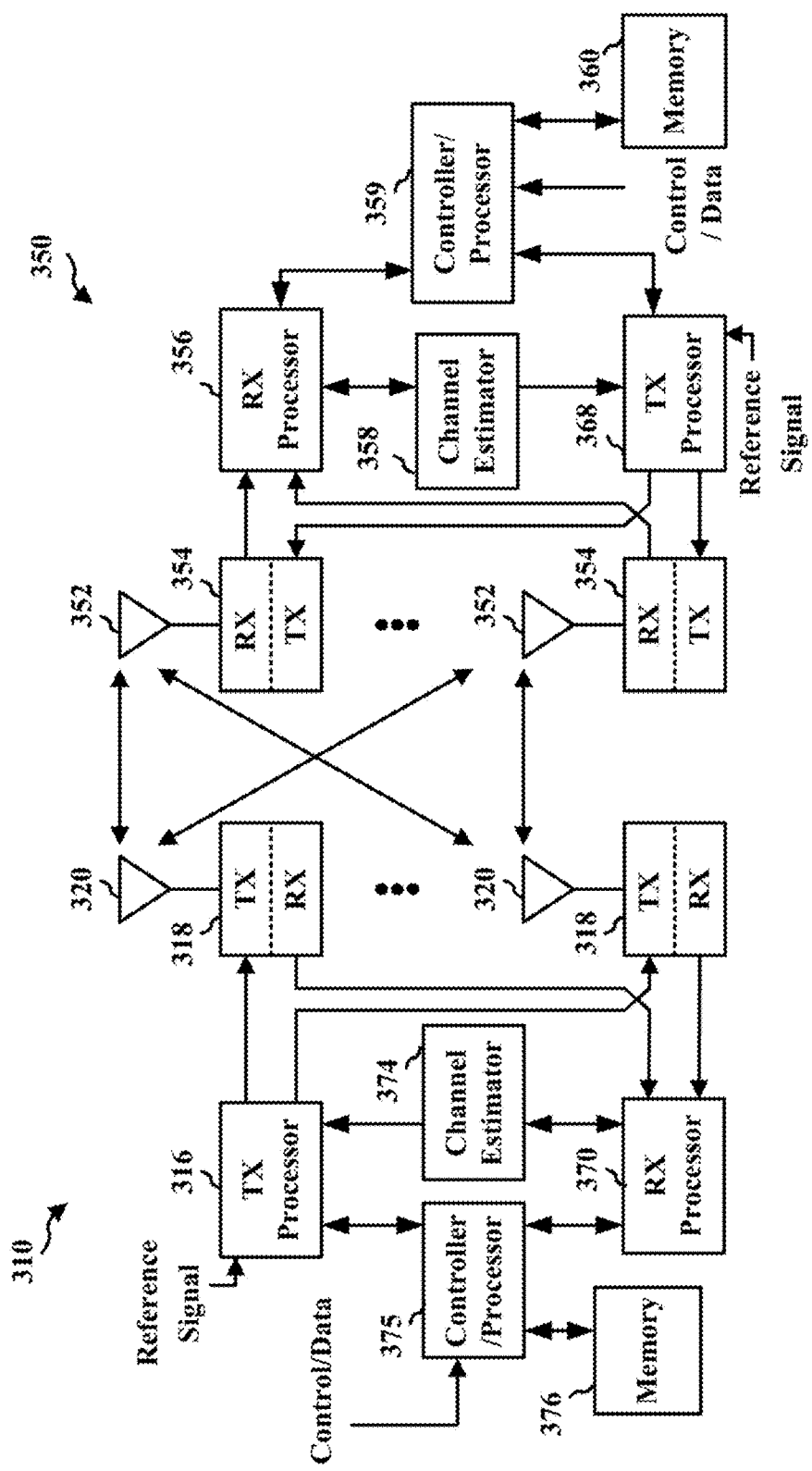
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the DL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
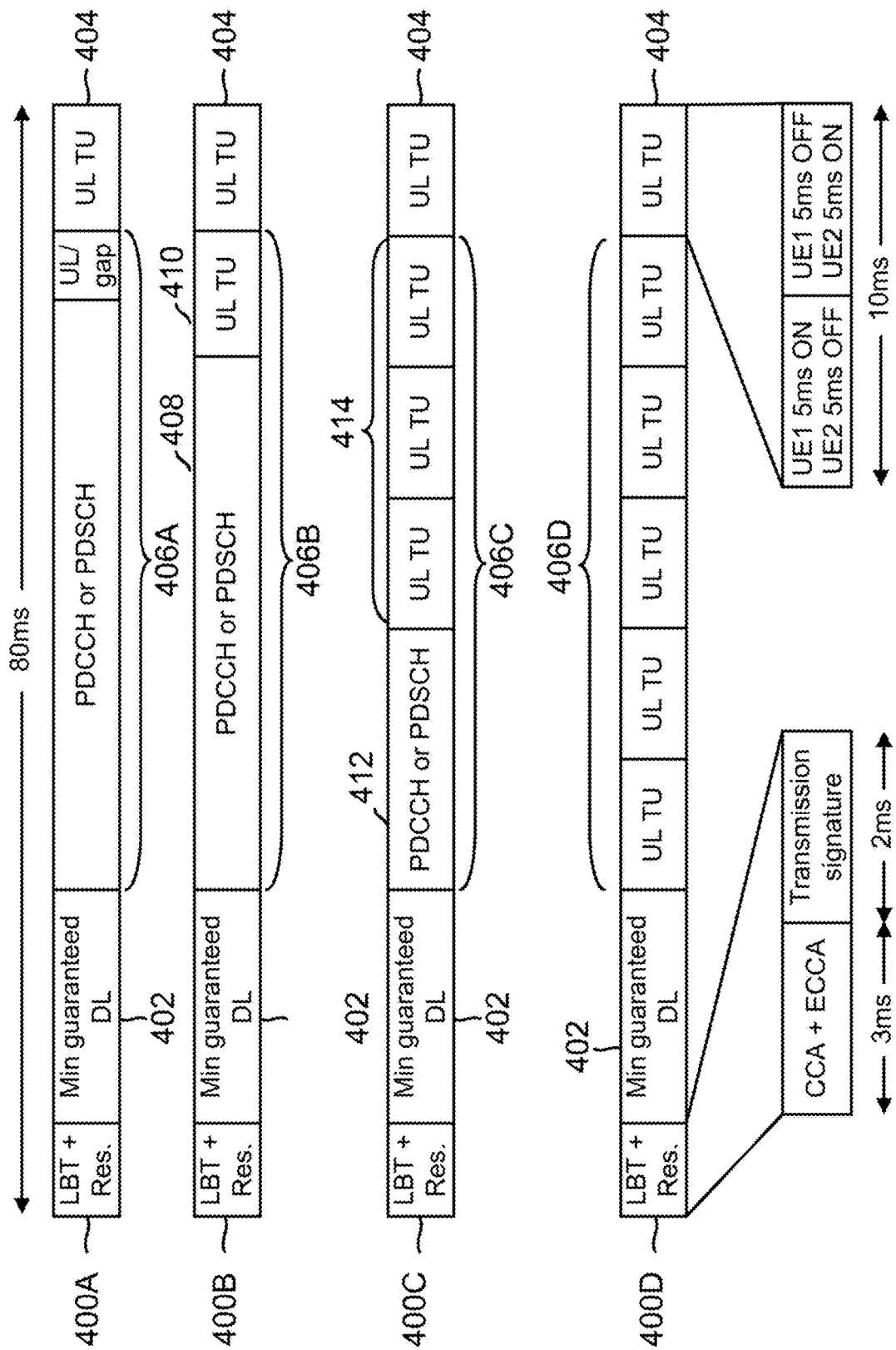
FIG. 4 illustrates different TDD frame structures for a set of subframes of a set of frames.

FIG. 4 is a generalized representation of frame structures 400A-400D for a set of frames. In this example, a temporal duration of each of the TDD frame structures 400A-400D is 80 ms where each TDD frame structure 400A-400D represents a set of frames. Therefore, there are 8 frames in each of the TDD frame structures 400A-400D shown in FIG. 4. Furthermore, in this example, each of the TDD frame structures 400A-400D includes LBT frames structures. Thus, the UE 104 begins each of the set of frames by performing a CCA or an enhanced CCA (ECCA), which has a temporal duration of approximately 3 ms. The UE 104 is then configured to listen for a transmission signature from the base station 180 during the next 2 ms. The UE 104 uses the transmission signature to detect transmission of the set of frames with one of the TDD frame structures 400A-400D.

Each of the TDD frame structures 400A-400D then has a minimum guaranteed set of subframes 402 for DL. The minimum guaranteed set of subframes 402 for DL may be used for a DL reference signal (DRS), radio resource management (RRM), and common control signals. The minimum guaranteed set of subframes 402 for DL may include at least one common PDCCH candidate and/or one UE specific PDCCH candidate for UEs with the highest coverage extension. However, as explained below, PDCCH candidates may also be allocated by the TDD frame structures 400A-400D to other subframes in the set of frames.

Additionally, each of the TDD frame structures 400A-400D may also include a minimum guaranteed set of subframes 404 for UL in the last frame of the set of frames. The minimum guaranteed set of subframes 404 for UL may have a temporal duration of 10 ms, or one frame. The set of subframes 404 in the last frame with the TDD frame structures 400A-400D may be utilized to provide physical UL resources such as the PUCCH, PRACH, ePRACH, ACK/NACK feedback, P-CSI (periodic channel state information), SRS, SR, etc.

However, as shown in FIG. 4, one of the problems with providing physical UL resources over the minimum guaranteed set of subframes 404 for the UL in the last frame of the set of frames is when there are multiple UEs that require physical UL resource allocations. For example, when a first UE uses the physical UL resources over the first 5 ms of the last frame to transmit, a second UE may not transmit. Conversely, when the second UE uses the physical UL resources over the final 5 ms of the last frame to transmit, the first UE may not transmit.

As such, to provide a frame structure with enhanced scheduling flexibility, the TDD frame structures 400A-400D may have different flexible sections 406A, 406B, 406C, 406D with different portions for assigning physical resources for the DL and for the UL. The allocation of the physical resources of the frame structures 400A-400D between the DL and UL may depend on the physical resources needed for transmission between the UE 104 and the base station 180. Each of the flexible sections 406A, 406B, 406C, 406D is provided between the minimum guaranteed set of subframes 402 for the DL and the minimum guaranteed set of subframes 404 for the UL in the last frame of the set of frames.

In the TDD frame structure 400A containing the flexible section 406A, the entire flexible section 406A is used for physical DL resources except for a small gap at the end of the flexible section 406A that is utilized as a UL/gap. As such, a subset of the subframes of the set of frames within the flexible section 406A may be used to provide PDCCHs and PDSCHs. Thus, a PDCCH search space may extend beyond the minimum guaranteed set of subframes 402 for DL into the entire flexible section 406A except for the UL/gap.

In the TDD frame structure 400B containing the flexible section 406B, the flexible section 406B includes a portion 408 for physical DL resources and a portion 410 that may be used for physical UL resources. As such, a subset of the subframes of the set of frames within the portion 408 may be used to provide PDCCHs and PDSCHs. In this example, the portion 410 includes the last frame in the frames within the flexible section 406B. Thus, the portion 410 may be used to provide physical UL resources such as the PUCCH, PRACH, ePRACH, ACK/NACK feedback, P-CSI, SRS, SR in addition to the minimum guaranteed set of subframes 404 for the UL.

In the TDD frame structure 400C containing the flexible section 406C, the flexible section 406C includes a portion 412 for physical DL resources and a portion 414 that may be used for physical UL resources. As such, a subset of the subframes of the set of frames within the portion 412 may be used to provide PDCCHs and PDSCHs. In this example, the portion 414 includes the last three frames in the frames within the flexible section 406C. Thus, the portion 414 may be used to provide physical UL resources such as the PUCCH, PRACH, ePRACH, ACK/NACK feedback, P-CSI, SRS, SR in addition to the minimum guaranteed set of subframes 404 for the UL.

In the TDD frame structure 400D containing the flexible section 406D, the entire flexible section 406D is used for physical UL resources. Thus, all five subframes within the flexible portion 406D are used for physical UL resources Thus, the entire flexible section 406D may be used to provide physical UL resources such as the PUCCH, PRACH, ePRACH, ACK/NACK feedback, P-CSI, SRS, SR in addition to the minimum guaranteed set of subframes 404 for the UL.

Figure 5:
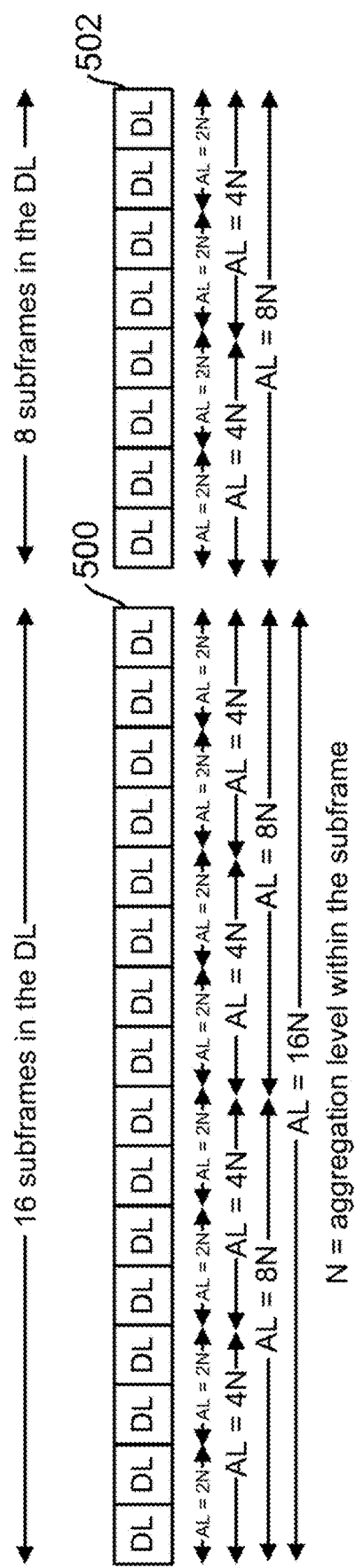
FIG. 5 illustrates PDCCH search spaces that are blind decoded based on a number of DL subframes and a maximum aggregation level.

FIG. 5 illustrates a pair of PDCCH search spaces 500, 502. The PDCCH search spaces 500, 502 are provided by different TDD frame structures, such as the TDD frame structures 400A-400D shown in FIG. 4. In this example, the PDCCH search space 500 has a maximum number of subframes that may contain PDCCH candidates for the UE 104 to search. For example, the PDCCH search space 500 may be provided by the TDD frame structure 400A in FIG. 4 with the flexible portion 406A. In this case the PDCCH search space 500 has a total number of 16 subframes, which may be the first 16 DL subframes in, or may be distributed through, the set of frames in a TDD frame structure.

With regard to the PDCCH search space 502, the PDCCH search space 502 has less than the maximum number of subframes in the search space 500, and may contain PDCCH candidates for the UE to search. In this example, the PDCCH search space 502 may be provided by the TDD frame structure 400B in FIG. 4 with the flexible portion 406B. The PDCCH search space 502 has a total number of 8 subframes, which may be the first 8 DL subframes in, or may be distributed through, the set of frames in a TDD frame structure.

Both of the PDCCH search spaces 500, 502 may be a function of the TDD frame structures. In particular, the number of PDCCH candidates in the PDCCH search spaces 500, 502 may be a function of the TDD frame structure. As explained above with regards to FIG. 1, the information from the base station 180 to the UE 104 may indicate at least one of a location or a size of a PDCCH search space within a set of subframes of a set of frames. The location and/or the size of the PDCCH search space are a function of the TDD frame structure of the set of frames. In one aspect, the UE 104 may determine the location and/or the size of a PDCCH search size from information on the TDD frame structure received from the base station 180.

For example, with regards to the TDD frame structure 400A having the flexible section 406A, the base station 180 may indicate that the number of DL subframes in the set of frames for the PDCCH search space 500 is 16 DL subframes. As such, the UE 104 may receive information from the base station 180 indicating the size of the PDCCH search space 500. In one aspect, the UE 104 may determine the size of the PDCCH search space 500 from information on the TDD frame structure received from the base station 180. The UE 104 may determine a search strategy over the PDCCH search space 500 of 16 DL subframes. Given that the PDCCH search space 500 has 16 DL subframes, the UE 104 may determine that a maximum aggregation level for the PDCCH search space 500 is 16. As mentioned, the number of CCEs in a PDCCH is called an aggregation level, and may be 1, 2, 4, 8, or 16 consecutive CCEs at the first 1, 2, or 3 symbols of 1, 2, 4, 8, or 16 consecutive subframes, respectively.

The UE 104 then performs a blind decoding or searching of the determined PDCCH search space 500 to obtain control information for the UE 104. In this example, the UE 104 performs a blind decoding or searching over the determined PDCCH search space 500 based on the determined maximum aggregation level of 16. Thus, the determined PDCCH search space 500 of 16 DL subframes has 1 PDCCH candidate at an aggregation level of 16 (which is the maximum aggregation level for the PDCCH search space 500), has 2 PDCCH candidates at an aggregation level of 8, has 4 PDCCH candidates at an aggregation level of 4, and 8 PDCCH candidates at an aggregation level of 2. The PDCCH candidates at an aggregation level of n may only start on a boundary of every n subframes. Using standard decoding techniques, the UE 104 performs PDCCH decoding of each of these PDCCH candidates in the PDCCH search space 500 to obtain common and/or UE specific control information.

In another example and with regards to the TDD frame structure 400B having the flexible section 406B, the base station 180 may indicate that the number of DL subframes in the set of frames for the PDCCH search space 502 is 8 DL subframes. As such, the UE 104 may receive information from the base station 180 indicating the size of the PDCCH search space 502. In one aspect, the UE 104 may determine the size of the PDCCH search space 502 from information on the TDD frame structure received from the base station 180. Thus, the UE 104 may determine a search strategy over the PDCCH search space 502 of 8 DL subframes. Given that the PDCCH search space 502 has 8 DL subframes, the UE 104 may determine that a maximum aggregation level for the PDCCH search space 502 is 8.

The UE 104 then performs a blind decoding of the determined PDCCH search space 502 to obtain control information for the UE 104. In this example, the UE 104 performs a blind decoding over the determined PDCCH search space 502 based on the determined maximum aggregation level of 8. Thus, the determined PDCCH search space 502 of 8 DL subframes has 1 PDCCH candidate at an aggregation level of 8 (which is the maximum aggregation level for the PDCCH search space 502), has 2 PDCCH candidates at an aggregation level of 4, and has 4 PDCCH candidates at an aggregation level of 2. Using standard decoding techniques, the PDCCH UE 104 performs decoding of each of these PDCCH candidates in the PDCCH search space 502 to obtain common and/or UE specific control information. Analogous processes and techniques may be provided by the UE 104 and the base station 180 with regards to the TDD frame structures 400C, 400D with the flexible sections 406C, 406D with PDCCH search spaces having a number of DL subframes of 4 and 2, respectively.

Within the control information (which may be DCI of a common PDCCH or a UE specific PDCCH), the UE 104 may also determine the expected TDD frame structure of the next frame or set of frames in addition to the current TDD frame structure. This TDD frame structure may be applicable even if the base station 180 does not transmit on the next frame due to LBT failure. The UE 104 may use the control information about the current and next TDD frame structure to determine resources for various physical channels, especially on the UL.

Figure 6:
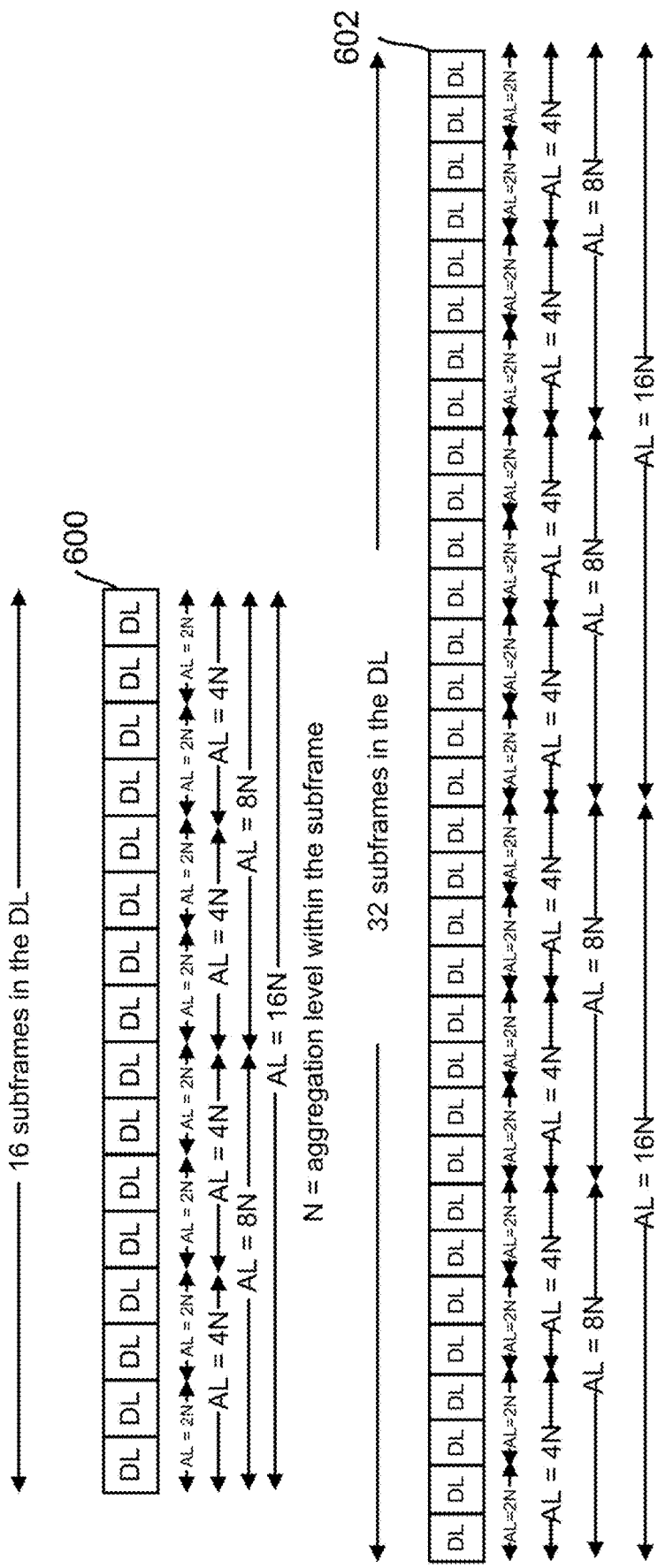
FIG. 6 illustrates PDCCH search spaces that are blind decoded based on a determined subset of blind decodes.

FIG. 6 illustrates a pair of PDCCH search spaces 600, 602 and are related to another technique for determining PDCCH candidates. The PDCCH search spaces 600, 602 are each provided by different TDD frame structures, such as the TDD frame structures 400A-400D shown in FIG. 4. For example, the PDCCH search space 600 has a number of subframes which may contain PDCCH candidates. In this case, the PDCCH search space 600 may be provided by the TDD frame structure 400B in FIG. 4 with the flexible portion 406B. In this case, the PDCCH search space 600 has a total number of 16 subframes, which may be the first 16 DL subframes in, or may be distributed through, the set of frames in the TDD frame structure.

With regard to the PDCCH search space 602, the PDCCH search space 602 has a greater number of subframes which may be provided with PDCCH candidates than the maximum aggregation level of 16 for the PDCCH. For example, the PDCCH search space 602 may be provided by the TDD frame structure 400A in FIG. 4 with the flexible portion 406A. In this case the PDCCH search space has a total number of 32 subframes, which may be the first 32 DL subframes in, or may be distributed through, the set of frames in the TDD frame structure.

Each of the PDCCH search space 600, 602 is a function of the TDD frame structures. In particular, the size of the PDCCH search space and the number of PDCCH candidates may scale as a function of the number of DL subframes in the TDD frame structure. As explained above with regards to FIG. 1, the information from the base station 180 to the UE 104 may indicate at least one of a location or a size of a PDCCH search space within a set of subframes of a set of frames. The location and/or the size of the PDCCH search space are a function of the TDD frame structure of the set of frames. In one aspect, the UE 104 may determine the location and/or the size of a PDCCH search size from information on the TDD frame structure received from the base station 180.

For example, with regards to the TDD frame structure 400B having the flexible section 406B, the base station 180 may indicate that the number of DL subframes in the set of frames for the PDCCH search space is 16 DL subframes. As such, the UE 104 may receive information from the base station 180 indicating the size of the PDCCH search space. The information indicating the size of a PDCCH search space 600 may be based on a number of DL subframes in the set of frames. In one aspect, the UE 104 may determine the size of the PDCCH search space 600 from information on the TDD frame structure received from the base station 180. The UE 104 may determine a search strategy over the PDCCH search space 600 of 16 DL subframes. Given that the PDCCH search space 600 is 16 DL subframes, the UE 104 may determine a search strategy to search for all PDCCH candidates at all possible aggregation level. In one aspect, to keep the number of blind decoding constant as the size of the PDCCH search space increases, the UE may search a subset of all the PDCCH candidates of the determined PDCCH search space 600.

The UE 104 then performs a blind decoding of the determined PDCCH search space 600 to obtain control information for the UE 104. The UE 104 may perform a blind decoding over the determined PDCCH search space 600 based on all PDCCH candidates or a subset of the PDCCH candidates. Thus, the determined PDCCH search space 600 has 1 PDCCH candidate at an aggregation level of 16, has 2 PDCCH candidates at an aggregation level of 8, has 4 PDCCH candidates at an aggregation level of 4, and 8 PDCCH candidates at an aggregation level of 2. Using standard decoding techniques, the UE 104 may perform PDCCH decoding of each of these PDCCH candidates in the PDCCH search space 600 to obtain common and/or UE specific control information.

In another example and with regards to the TDD frame structure 400A having the flexible section 406A, the base station 180 may indicate that the number of DL subframes in the set of frames for the PDCCH search space is 32 DL subframes. As such, the UE 104 may receive information from the base station 180 indicating the size of the PDCCH search space. The information indicating the size of a PDCCH search space 602 may be based on a number of DL subframes in the set of frames, which in the example for the PDCCH search space 602 is 32. In one aspect, the UE 104 may determine the size of the PDCCH search space 602 from information on the TDD frame structure received from the base station 180. The UE 104 may determine a search strategy over the PDCCH search space 602 of 32 DL subframes. In one aspect, the UE 104 may use information received from the base station 180 such as a cell radio network temporary identifier (C-RNTI) or a user identifier (UE-ID) when determining the search strategy. For example, to keep the number of blind decoding constant as the size of the PDCCH search space increases, the UE may search a subset of all the PDCCH candidates of the determined PDCCH search space 602 as a function of the C-RNTI, UE-ID, slot number, subframe number, frame number, etc.

The UE 104 then performs a blind decoding of the determined PDCCH search space 602 to obtain control information for the UE 104. Given that the PDCCH search space 602 has 32 DL subframes, the UE 104 may perform a blind decoding of all possible PDCCH candidates over the determined PDCCH search space 602. The maximum aggregation level for the PDCCH is 16 and there are 2 PDCCH candidates over the PDCCH search space of 32 DL subframes. For the aggregation level of 8, there are 4 PDCCH candidates. For the aggregation level of 4, there are 8 PDCCH candidates. For the aggregation level of 2, there are 16 PDCCH candidates. Using standard decoding techniques, the UE 104 may perform PDCCH decoding of each of these PDCCH candidates in the PDCCH search space 602 to obtain common and/or UE specific control information.

In one aspect, the UE 104 may perform a blind decoding of a subset of the possible PDCCH candidates, subject to a minimum at each aggregation level. The subset of the PDCCH candidates for blind decodes may be determined based on at least one of the C-RNTI or the user identifier UE-ID. Thus, the UE 104 may perform a blind decoding of only 16 of the 32 DL subframes in the PDCCH search space 602 at each of the aggregation levels of 16, 8, 4, 2. Which 16 of the 32 DL subframes to perform the blind decoding at each aggregation level may be determined based on at least one of the C-RNTI, the user identifier UE-ID, slot number, subframe number, frame number or some other information about the UE 104 or the frame structure.

For example, the UE 104 may perform the blind decoding over the determined PDCCH search space 602 at the maximum aggregation level of 16 over the first 16 of the 32 DL subframes. Thus, 1 PDCCH candidate is decoded at the aggregation level of 16. Additionally, the UE 104 may perform the blind decoding over the determined PDCCH search space 602 at the aggregation level of 8 over 16 of the 32 DL subframes. Thus, 2 PDCCH candidates are decoded at the aggregation level of 8. Furthermore, the UE 104 may perform the blind decoding over the determined PDCCH search space 602 at the aggregation level of 4 over 16 of the 32 DL subframes. Thus, 4 PDCCH candidates are decoded at the aggregation level of 4. Finally, the UE 104 may perform the blind decoding over the determined PDCCH search space 602 at the aggregation level of 2 over 16 of the 32 DL subframes. Thus 8 PDCCH candidates are decoded at the aggregation level of 2. Using standard decoding techniques, the UE 104 may perform PDCCH decoding of each of these PDCCH candidates in the PDCCH search space 602 to obtain common and/or UE specific control information.

Because the UE 104 may determine which of the 16 of the 32 subframes to perform blind decoding based on at least one of the C-RNTI, the user identifier UE-ID, slot number, subframe number, frame number or some other information about the UE 104 or the frame structure, one large grant of common and/or UE specific control information in the PDCCH does not block scheduling other UEs within the same frames. Also, UE multiplexing is beneficial because for higher coverage enhancements, it is more efficient for the UE 104 to transmit on the UL on narrowband (e.g., 1RB or 2RB) and the rest of the RBs can be used to schedule other UEs.

Figure 7:
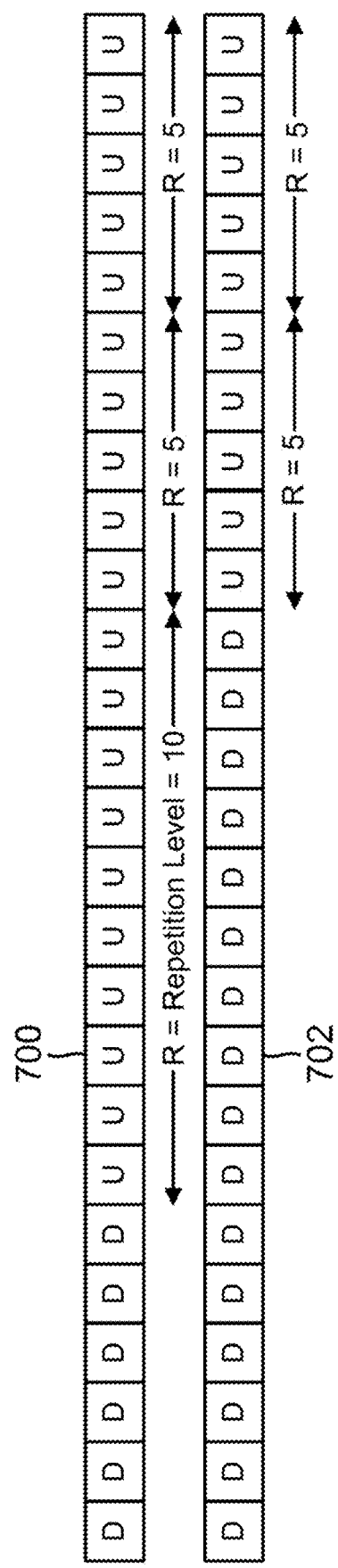
FIG. 7. illustrates different TDD frame structures with different numbers of UL subframes for assigning physical UL resources.

FIG. 7 illustrates a pair of TDD frame structures 700, 702. The TDD frame structures 700, 702 may be examples of the TDD frame structures 400 shown in FIG. 4. The TDD frame structure 700 has a number of UL subframes which may be provided in the last frame and the second to last frame of the set of frames. For example, the TDD frame structure 700 may be an example of the TDD frame structure 400B in FIG. 4 with the flexible portion 406B. In this case, the TDD frame structure 700 has a total number of 20 UL subframes.

With regard to the TDD frame structure 702, the TDD frame structure 702 has a number of UL subframes which may be provided in the last frame of the set of frames. For example, the TDD frame structure 702 may be an example of the TDD frame structure 400A in FIG. 4 with the flexible portion 406A. In this case, the TDD frame structure 700 has a total number of 10 UL subframes.

The UE 104 is configured to determine the TDD frame structure. For example, if the TDD frame structure is the TDD frame structure 700, the base station 180 may transmit and the UE 104 may receive information indicating the TDD frame structure 700. In one aspect, the UE 104 may receive information on the TDD frame structure through the PBCH, the MIB, or the SIB. In one case, the control information in the common PDCCH or UE specific PDCCH for the UE 104 is used as the information that indicates the TDD frame structure 700. Similarly, if the TDD frame structure is the TDD frame structure 702, the base station 180 may transmit and the UE 104 may receive information indicating the TDD frame structure 702.

Periodically, the base station 180 may assign physical resources (in particular, physical uplink resources) which the UE 104 then uses to transmit uplink access, uplink control information, and other non-data information. For example, the UE 104 may be configured to determine a location of at least one of a PRACH, PUCCH, SRS, SR resources based on the determined TDD frame structure. The PRACH/PUCCH/SRS/SR resources at a certain repetition level may be semi-statically configured to occur at a fixed location in time or frequency. For example, the repetition level for the PRACH/PUCCH/SRS/SR resources in the TDD frame structure 700 is 10 while the repetition level in the TDD frame structure 702 is 5. In one aspect, the PRACH/ PUCCH/SRS/SR resources may be configured to occur even when the base station 180 does not clear the medium. If the PRACH/PUCCH/SRS/SR resources are configured to occur on a UL subframe assigned for the PRACH/PUCCH/SRS/ SR resources based on the information on the frame structure, then the PRACH/PUCCH/SRS/SR resources are available for transmission over the assigned UL subframe. Otherwise, if the PRACH/PUCCH/SRS/SR resources are configured to occur on a DL subframe or on a UL subframe not assigned for the PRACH/PUCCH/SRS/SR resources, then the PRACH/PUCCH/SRS/SR resources are not available.

In one aspect, the UE 104 may receive information indicating a change in the TDD frame structure for a second set of frames that follow the set of frames. For example, the PRACH/PUCCH/SRS/SR resources may occur only at fixed subframe locations such as in the second to last frame in the TDD frame structure 700. However, if these subframe locations are not UL subframes, like in the TDD frame structure 702, the PRACH/PUCCH/SRS/SR resources would not be available and would not be provided at all. Thus, if the first set of frames is provided with the TDD frame structure 700 while a second set of frames is provided with the TDD frame structure 702, the UE 104 may receive information from the base station 180 indicating a change in the TDD frame structure from the TDD frame structure 700 for the first set of frames to the TDD frame structure 702 for a second set of frames. In this case, the UE 104 would know that the PRACH/PUCCH/SRS/SR resources are not available in the second to last frame within the TDD frame structure 702.

In one aspect, the PRACH and SR resources may be available dynamically, such as when the PRACH and SR resources are configured to occur at a repetition level, and may be usable by the UE 104 as they are not scheduled for use by the base station 180. In one aspect, the availability of the PUCCH resources, such as ACK/NACK resources, used by the UE 104 for the UL may be indicated in the DL grant. In one aspect, the availability of the resources for P-CSI transmission is dependent on the availability of the PUCCH resources or PUSCH resources. If the PUCCH or PUSCH resources are available, the P-CSI is transmitted. Otherwise, the transmission of the P-CSI is dropped. In one aspect, with regards to the measurements of the PRS received from the base station 180, the number of the subframes over which the PRS is transmitted may be static or may be a function of the frame structure. The UE 104 may determine from the frame structure the number of subframes over which the PRS is transmitted. The UE 104 may measure the PRS over the determined number of subframes and may transmit the measured PRS to the base station 180 using the UL subframes.

Given that the UE 104 is configured to determine the TDD frame structure, the UE 104 may also use the TDD frame structure to determine resources available for making measurements relevant to the base station 180. For example, the UE 104 may determine a number of subframes over which to measure and to average a channel quality based on the determined TDD frame structure. The UE 104 may then send a CQI measured over the determined number of subframes and may transmit the CQI over a number of UL subframes, such as using the PUCCH resources when they are available.

Figure 8:
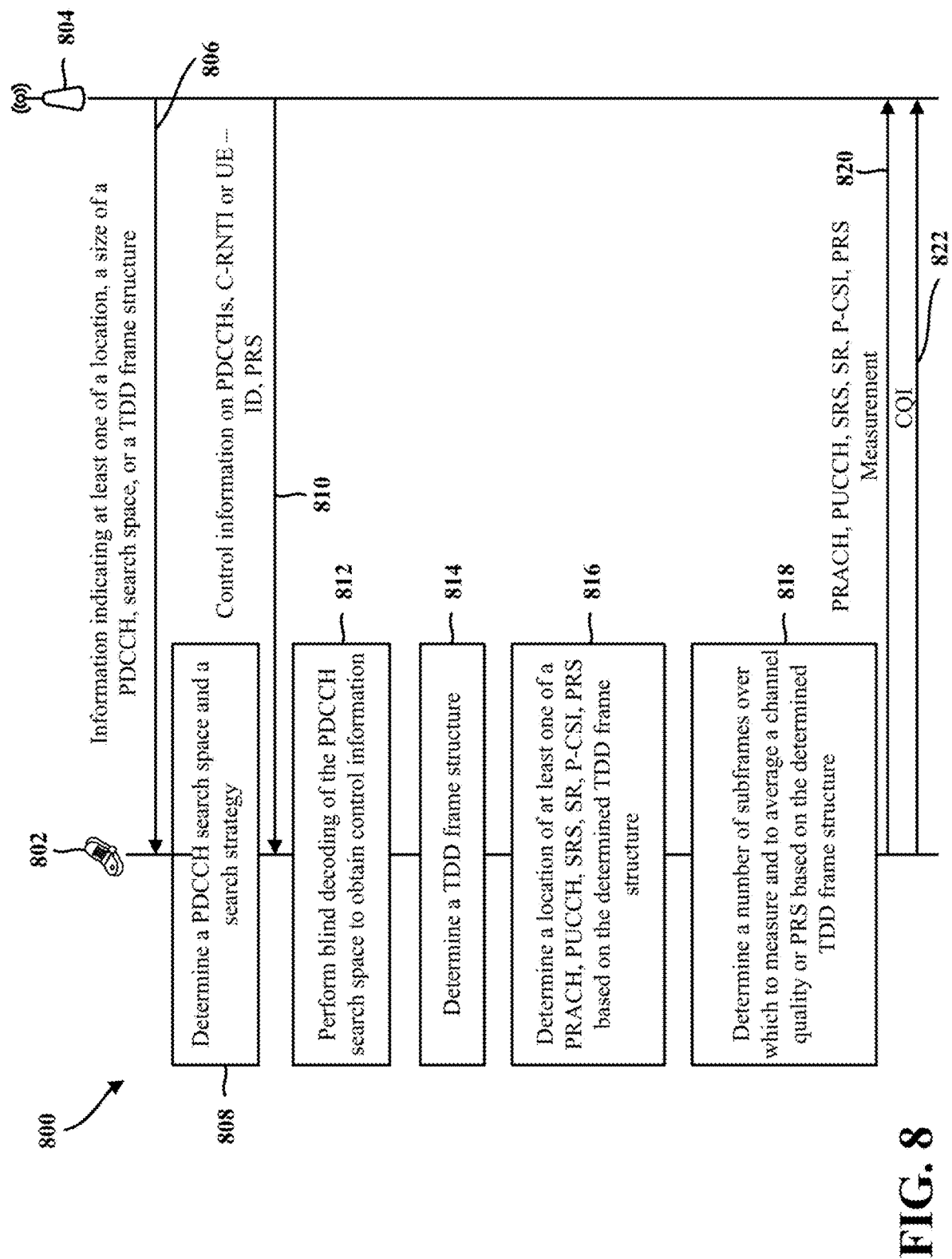
FIG. 8 illustrates a call flow diagram between a UE and a base station.

FIG. 8 illustrates a call flow 800 illustrating certain aspects of the disclosure with respect to a UE 802 and a base station 804. At procedure 806, the base station 804 transmits and the UE 802 may receive information indicating at least one of a location or a size of a PDCCH search space within a set of subframes of a set of frames. The location and/or the size of the PDCCH search space are a function of the TDD frame structure of the set of frames, as explained above with regards to FIG. 4-6. In one aspect, the base station 804 may transmit and the UE 802 may receive information indicating the TDD frame structure of the set of frames. For example, the information may indicate the number of DL frames or the number of DL subframes in the set of frames. The information may be broadcast in a physical DL channel, such as the physical broadcast channel (PBCH), and be provided as information within a master information block (MIB) or a system information block (SIB).

At procedure 808, the UE 802 may determine the PDCCH search space within the set of subframes and a search strategy. The UE 802 determines the PDCCH search space based on the received information indicating the at least one of the location or the size of the PDCCH search space, or based on the received information indicating the structure of the TDD frames in the set of frames. For example, the base station 180 may indicate the number of DL subframes in the set of frames for the PDCCH search space. In one aspect, the UE 802 may determine the number of DL subframes from information on the TDD frame structure, and from the number of DL subframes, the UE 802 may determine the location and/or size of the PDCCH search space. For the search strategy, the UE 802 may determine a maximum aggregation level for the PDCCH search space (e.g., See FIG. 5) based on the number of DL subframes in the set of frames of the PDCCH search space. In one aspect, the UE 802 may determine a search strategy to search for all PDCCH candidates at all possible aggregation level. In one aspect, to keep the number of blind decoding constant as the size of the PDCCH search space increases, the UE 802 may determine a search strategy to search a subset of all the PDCCH candidates of the determined PDCCH search space at different aggregation levels, subject to a minimum of blind decodes at each aggregation level (e.g., See FIG. 6).

At procedure 810, the base station 804 transmits control information on PDCCHs, a C-RNTI or UE-ID for the UE 802, and a PRS to the UE 802. The UE 802 then performs a blind decoding over the determined PDCCH search space to obtain control information for the UE 802, as shown in procedure 812. The UE 802 may perform the blind decoding over the determined PDCCH search space 502 based on the determined maximum aggregation to search for all PDCCH candidates at all possible aggregation level according to the search strategy (e.g., See FIG. 5). In one aspect, the UE 802 may search a subset of all the PDCCH candidates of the determined PDCCH search space at different aggregation levels according to the search strategy (e.g., See FIG. 6). In one aspect, the subset of blind decodes may be determined based on at least one of a C-RNTI, a user identifier UE-ID for the UE 802, slot number, subframe number, frame number or some other information about the UE 104 or the frame structure, subject to a minimum of blind decodes at each aggregation level.

Using standard decoding techniques, the UE 802 may perform PDCCH decoding of each of these PDCCH candidates in the PDCCH search space to obtain common and/or UE specific control information. In one aspect, within the control information (which may be DCI of a common PDCCH or a UE specific PDCCH), the base station 804 can indicate the expected TDD frame structure of the next frame in addition to the current TDD frame structure. The UE 802 may use the control information about the current and next TDD frame structure to determine resources for various physical channels, especially on the UL.

Accordingly, at procedure 814, the UE 802 determines a TDD frame structure, such as the assignment of the UL subframes. The UE 802 may receive information indicating the TDD frame structure, such as within the control information in the PDCCH (either common or UE specific). In one aspect, the UE 104 may receive information on the TDD frame structure through the PBCH, the MIB, or the SIB. Periodically, the base station 804 assigns physical resources (in particular, physical uplink resources) which the UE 104 then uses to transmit uplink access, uplink control information, and other non-data information. At procedure 816, based on the determined TDD frame structure, the UE 802 determines a location of at least one of a PRACH, a PUCCH, SRS, SR resources. For example, as explained in FIG. 7, the PRACH/PUCCH/SRS/SR resources at a certain repetition level may be semi-statically configured to occur at a fixed location in time or frequency. If the PRACH/PUCCH/SRS/SR resources are configured to occur on a UL subframe of the frame structure assigned for the PRACH/PUCCH/SRS/SR resources, then the PRACH/PUCCH/SRS/SR resources are available for transmission over the assigned UL subframe. Otherwise, if the PRACH/PUCCH/SRS/SR resources are configured to occur on a DL subframe or on a UL subframe not assigned for the PRACH/PUCCH/SRS/SR resources, then the PRACH/PUCCH/SRS/SR resources are not available for transmission.

In another example explained in FIG. 7, the UE 802 may receive information indicating a change in the TDD frame structure for a second set of frames that follow the current set of frames. For example, the PRACH/PUCCH/SRS/SR resources may occur only at fixed subframe locations. Thus, if these subframe locations are UL subframes, the PRACH/PUCCH/SRS/SR resources are available. However, if these subframe locations are not UL subframes, the PRACH/PUCCH/SRS/SR resources would not be available and would not be provided at all. Thus, the UE 802 may receive information from the base station 804 indicating a change in the TDD frame structure.

Given that the UE 802 is configured to determine the TDD frame structure, the UE 802 may also use the TDD frame structure to determine resources available for making measurements relevant to the base station 804. For example, at procedure 818 the UE 802 may determine a number of DL subframes over which to measure and to average a CQI based on the determined TDD frame structure. In one aspect, the UE 802 may determine a number of DL subframes over which the PRS is received from the base station 804 based on the determined TDD frame structure for the UE 802 to measure the PRS.

At procedure 820, the UE 802 may then transmit PRACH/PUCCH/SRS/SR/P-CSI using the at least one of the PRACH, the PUCCH, the SRS, or the SR resources based on the determined location of the PRACH, the PUCCH, the SRS, or the SR resources. With regards to the PRS, the UE 802 may be configured to measure the PRS based on the determined number of DL subframes containing the PRS, which was received at procedure 810. The UE 802 may transmit the PRS measurement to the base station 804 using one or more UL subframes, such as using the PUCCH resources when they are available. In one aspect, the UE 802 is configured to measure and to average the CQI based on the determined number of DL subframes over which to make the CQI measurement. At procedure 822, the UE 802 sends the CQI to the base station 804. The UE 802 may transmit the CQI over a number of UL subframes, such as using the PUCCH resources when they are available.

Figure 9:
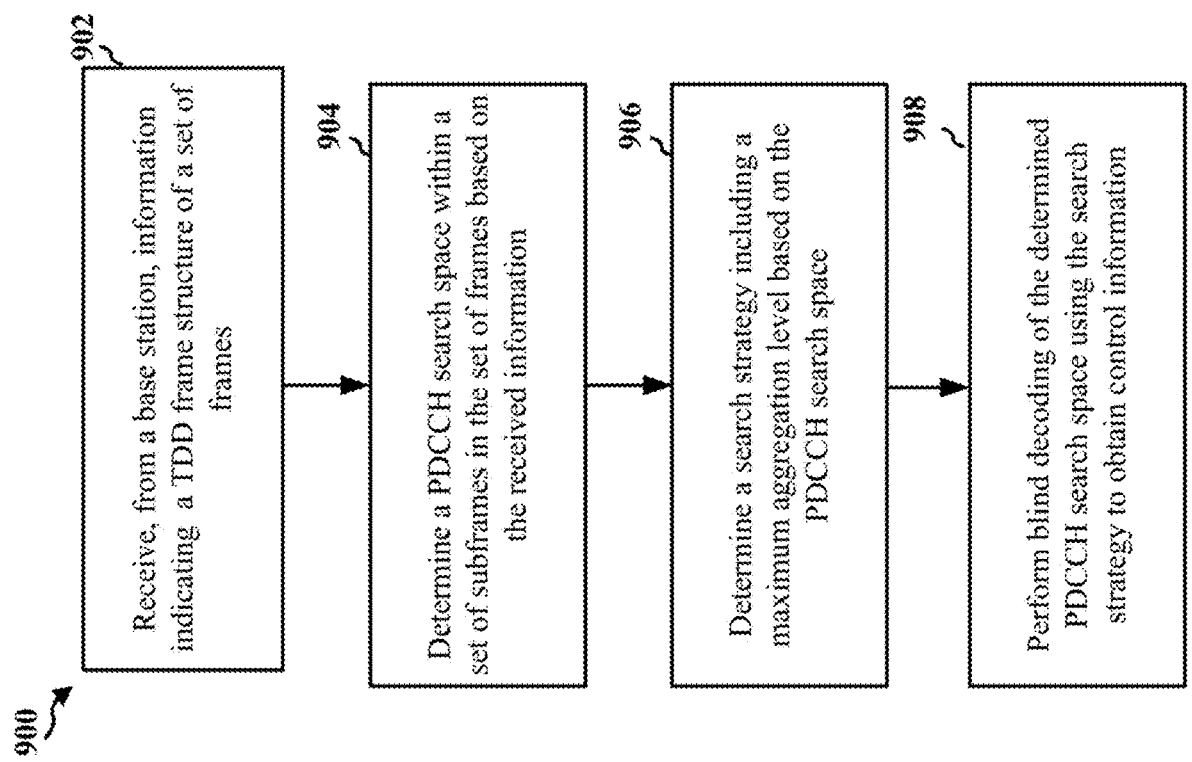
FIG. 9 illustrates a flow chart where a UE obtains control information from a PDCCH search space.

FIG. 9 is a flowchart 900 of a method of wireless communication. The method may be performed by a UE (e.g., 104, 802) to obtain control information that are allocated in a flexible manner into subframes as a function of a TDD frame structure. For example, the UE may determine a PDCCH search space and a search strategy from a TDD frame structure and may perform a blind decoding of the PDCCH search space to obtain downlink control information.

At 902, the UE receives, from a base station, information indicating a TDD frame structure of a set of frames. For example, the information may indicate the number of DL frames or the number of DL subframes in the set of frames. In one aspect, the information may indicate at least one of a location or a size of a PDCCH search space within a set of subframes in the set of frames. The location and/or the size of the PDCCH search space are a function of the TDD frame structure of the set of frames. The base station may broadcast the information in a physical DL channel, such as the PBCH, and may provide the information within a MIB or a SIB.

At 904, the UE determines a physical downlink control channel PDCCH search space within a set of subframes in the set of frames based on the received information indicating the TDD frame structure. The PDCCH search space may indicate at least one of a location or a size of the PDCCH search space. The location or the size of the PDCCH search space is a function of a TDD frame structure of the set of frames. In one aspect, the received information may indicate the number of DL subframes in the set of frames for the PDCCH search space. In one aspect, the UE may determine the number of DL subframes from information on the TDD frame structure, and from the number of DL subframes, the UE may determine the location and/or size of the PDCCH search space.

At 906, the UE determines a search strategy including a maximum aggregation level based on the PDCCH search space. For example, the UE may determine a search strategy based on the location and/or size of the PDCCH search space. In one aspect, the UE may determine a search strategy to search for all PDCCH candidates at all possible aggregation levels based on the maximum aggregation level within the PDCCH search space. In one aspect, to keep the number of blind decoding constant as the size of the PDCCH search space increases, the UE may determine a search strategy to search a subset of all the PDCCH candidates of the PDCCH search space at different aggregation levels.

At 908, the UE performs a blind decoding of the determined PDCCH search space using the search strategy to obtain control information. In one aspect, the UE may perform a blind decoding of all possible PDCCH candidates at all possible aggregation levels based on a maximum aggregation level over the determined PDCCH search space. For example, if the PCCH search space is 32 DL subframes, the UE may search for all 2 PDCCH candidates for the maximum aggregation level of 16, for all 4 PDCCH candidates for the aggregation level of 8, for all 8 PDCCH candidates for the aggregation level of 4, and for all 16 PDCCH candidates for the aggregation level of 2. In one aspect, the UE may perform a blind decoding of a subset of the possible PDCCH candidates, subject to a minimum at each aggregation level.

Figure 10:
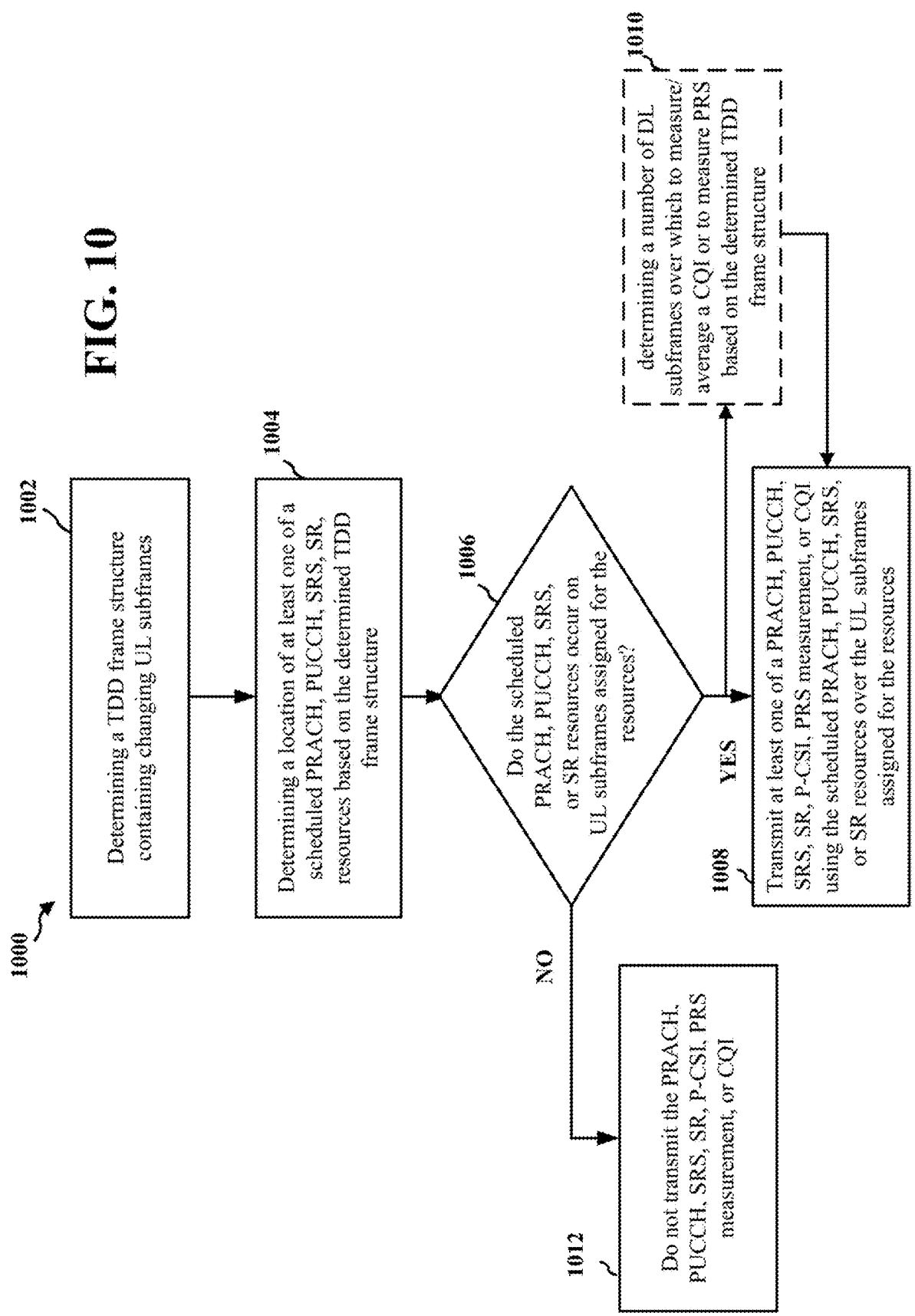
FIG. 10 illustrates a flow chart where a UE communicates on physical UL channels.

FIG. 10 is a flowchart 1000 of a method of wireless communication. The method may be performed by a UE (e.g., 104, 802) to determine a plurality of UL subframes that are allocated in a flexible manner as a function of a TDD frame structure. The plurality of UL subframes may be assigned by the base station for transmitting UL resources associated with a number of control signaling. The UE may determine a location of a scheduled UL resource within the TDD frame structure for communicating one of the number of the control signaling. The control signaling may include PRACH, PUCCH, SRS, or SR.

At 1002, the UE determines a TDD frame structure. The UE may determine the TDD frame structure, such as the assignment of the UL subframes, from the control information in the PDCCH (either common or UE specific). The assignment of the UL subframes may dynamically change as a function of the TDD frame structure. In one aspect, the UE may determine the TDD frame structure through the PBCH, the MIB, or the SIB. The base station may periodically assign physical uplink resources which the UE may use to transmit uplink access, uplink control information, and other non-data information.

At 1004, the UE determines a location of at least one of a scheduled PRACH, a PUCCH, SRS, or SR resources. For example, the PRACH, PUCCH, SRS, or SR resources at a certain repetition level may be semi-statically configured to occur at a fixed location in time or frequency. If the PRACH/PUCCH/SRS/SR resources are configured to occur on a UL subframe of the frame structure assigned for the PRACH/PUCCH/SRS/SR resources, then the PRACH/PUCCH/SRS/SR resources are available for transmission over the assigned UL subframe. Otherwise, if the PRACH/PUCCH/SRS/SR resources are configured to occur on a DL subframe or on a UL subframe not assigned for the PRACH/PUCCH/SRS/SR resources, then the PRACH/PUCCH/SRS/SR resources are not available for transmission.

At 1006, the UE determines if the scheduled PRACH, PUCCH, SRS, or SR resources are configured to occur on a UL subframe of the TDD frame structure assigned for the PRACH, PUCCH, SRS resources. For example, the repetition level for the PRACH/PUCCH/SRS/SR resources in the TDD frame structure may be 10 subframes. The UE determines if the repetition level for the PRACH/PUCCH/SRS/SR resources coincide with a UL subframe assigned for the PRACH/PUCCH/SRS/SR resources based on the frame structure.

At 1008, if the scheduled PRACH, PUCCH, SRS, or SR resources are configured to occur on a UL subframe of the TDD frame structure assigned for the PRACH, PUCCH, SRS resources, the UE may transmit at least one of the PRACH, PUCCH, SRS, SR, or P-CSI using the scheduled PRACH, PUCCH, SRS, or SR resources over the assigned UL subframe. For example, the PRACH resource may occur only at fixed subframe locations. If one of these subframe locations coincides with a UL subframe assigned for the PRACH resource, the UE may transmit the PRACH resource over the UL subframe.

Otherwise, at 1012, if the scheduled PRACH, PUCCH, SRS resources are configured to occur on a DL subframe or on a UL subframe not assigned for the PRACH, PUCCH, SRS, or SR resources, then the UE does not transmit the PRACH, PUCCH, SRS, SR, or P-CSI. For example, the PRACH resource may occur only at fixed subframe locations. If one of these subframe locations coincides with a DL subframe, or a UL subframe not assigned for the PRACH resource, then the UE does not transmit the PRACH resource.

In one aspect, at 1010, the UE determines a number of DL subframes over which to measure and to average a CQI based on the determined TDD frame structure. The UE may measure and average the CQI based on the determined number of DL subframes. In one aspect, at 1010, the UE may determine a number of DL subframes over which the PRS is received from a base station based on the determine TDD frame structure for the UE to measure the PRS. The UE may measure the PRS based on the determined number of DL subframes containing the PRS. At 1008, the UE sends the CQI or the PRS measurement using at least one of the scheduled PRACH, PUCCH, SRS, SR resources over one of the UL subframes assigned if the scheduled PRACH, PUCCH, SRS, or SR resources occur on a UL subframe of the TDD frame structure assigned for the PRACH, PUCCH, SRS resources. For example, The UE may transmit the CQI or the PRS measurement over a number of UL subframes, such as using the PUCCH resources when they are available. If the scheduled PRACH, PUCCH, SRS resources are configured to occur on a DL subframe or on a UL subframe not assigned for the PRACH, PUCCH, SRS, or SR resources, then the UE does not transmit the CQI or the PRS measurement.

Figure 11:
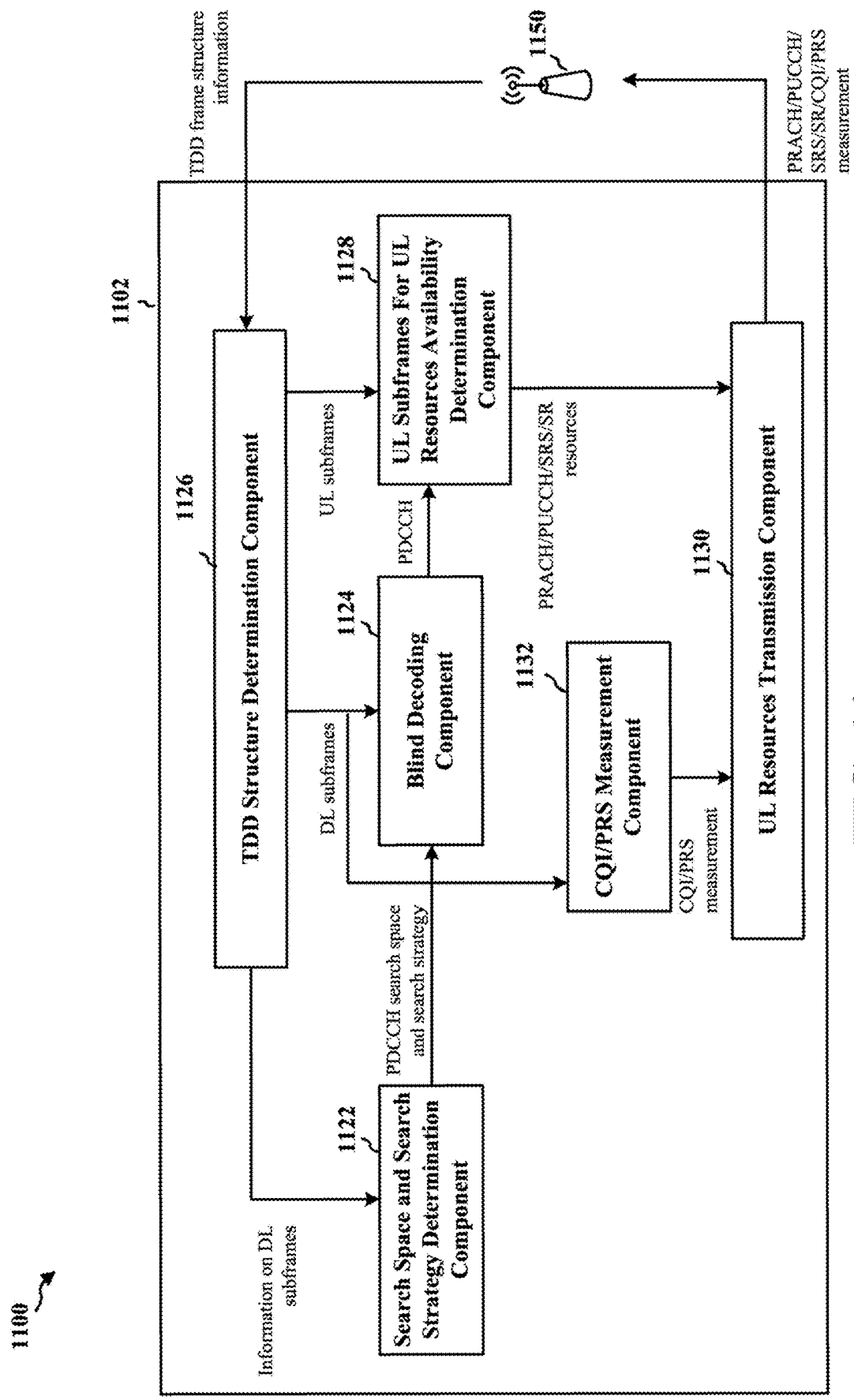
FIG. 11 a conceptual data flow diagram illustrating the data flow between different modules/means/components in an exemplary apparatus.

FIG. 11 a conceptual data flow diagram illustrating the data flow between different modules/means/components in an exemplary apparatus 1102. The apparatus 1102 may be a UE. The apparatus 1102 may include a TDD structure determination component 1126, a search space and search strategy determination component 1122, a blind decoding component 1124, a UL subframes for UL resources availability determination component 1128, and a CQI/PRS measurement component, a UL resources transmission component 1130. The TDD structure determination component 1126 may be configured to receive, from a base station, via an antenna 1150, information about a time division duplex (TDD) frame structure of a plurality of frames and/or to determine the TDD frame structure. For example, the information may indicate the number of DL frames or the number of DL subframes in the set of frames. The TDD structure determination component 1126 may be configured to pass information on the number of DL frames or the number of DL subframes to the search space and search strategy determination component 1122.

The search space and search strategy determination component 1122 may be configured to determine the PDCCH search space within the set of DL subframes and to determine a search strategy. For example, from the information on the number of DL subframes of the TDD frame structure received from the TDD structure determination component 1126, the location and/or the size of the PDCCH search space may be determined. For the search strategy, a maximum aggregation level may be determined. The search strategy may determine whether to search all or a subset of the PDCCH candidates in the PDCCH search space based on the number of DL subframes of the PDCCH search space. The search space and search strategy determination component 1122 may be configured to generate information on the PDCCH search space and the search strategy to the blind decoding component 1124. The blind decoding component 1124 may be configured to perform a blind decoding over the determined PDCCH search space to obtain control information for the apparatus 1102. For example, the blind decoding component 1124 may be configured to perform the blind decoding over the PDCCH search space based on the determined maximum aggregation to search for all PDCCH candidates at all possible aggregation level. In one aspect, the blind decoding component 1124 may be configured to search a subset of all the PDCCH candidates of the PDCCH search space at different aggregation levels according to the search strategy. The blind decoding component 1124 may be configured decode each of these PDCCH candidates in the PDCCH search space to obtain common and/or UE specific control information. The control information in the PDCCH about the current TDD frame structure may be used by the apparatus 1102 to determine resources for UL.

The UL subframes for UL resources availability determination component 1128 may be configured to receive the control information in the PDCCH from the search space and search strategy determination component 1122. The UL subframes for UL resources availability determination component 1128 may also be configured to receive, from the TDD structure determination component 1126, information on UL physical resources that may be used to transmit uplink access, uplink control information, and/or other non-data information. The UL subframes for UL resources availability determination component 1128 may be configured to determine a location of at least one of a PRACH, a PUCCH, SRS, SR resources. If the PRACH/PUCCH/SRS/SR resources are configured to occur on a UL subframe of the frame structure assigned for the PRACH/PUCCH/SRS/SR resources, then the PRACH/PUCCH/SRS/SR resources are available for transmission over the assigned UL subframe. Otherwise, if the PRACH/PUCCH/SRS/SR resources are configured to occur on a DL subframe or on a UL subframe not assigned for the PRACH/PUCCH/SRS/SR resources, then the PRACH/PUCCH/SRS/SR resources are not available for transmission. The UL subframes for UL resources availability determination component 1128 may be configured to transmit PRACH/PUCCH/SRS/SR resources that are available for transmission to the UL resources transmission component 1130.

The UL resources transmission component 1130 may be configured to communicate PRACH/PUCCH/SRS/SR using the scheduled UL resource over one of the plurality of UL subframes when the location of the scheduled UL resource for communicating PRACH/PUCCH/SRS/SR occurs on one of the plurality of UL subframes assigned for transmitting the scheduled UL resource, as determined by the UL subframes for UL resources availability determination component 1128. The UL resources transmission component 1130 may be configured to communicate the PRACH/PUCCH/SRS/SR to the antenna 1150 for UL transmission to the base station.

The CQI/PRS measurement component 1132 may be configured to determine a number of DL subframes over which to measure and to average a CQI based on the TDD frame structure received from the TDD structure determination component 1126. The CQI/PRS measurement component 1132 may be configured to measure and to average the CQI based on the determined number of DL subframes. In one aspect, the CQI/PRS measurement component 1132 may be configured to determine a number of DL subframes over which the PRS is received from a base station based on the TDD frame structure for the apparatus 1102 to measure the PRS. The CQI/PRS measurement component 1132 may be configured to measure the PRS based on the number of DL subframes containing the PRS. The CQI/PRS measurement component 1132 may be configured to send the CQI or the PRS measurement to the UL resources transmission component 1130. The UL resources transmission component 1130 may be configured to use at least one of the scheduled PRACH, PUCCH, SRS, SR resources over one of the UL subframes to communicate the CQI or the PRS measurement, such as using the PUCCH resources when they are available. The UL resources transmission component 1130 may be configured to communicate the CQI or the PRS measurement to the antenna 1150 for UL transmission to the base station.

Figure 12:
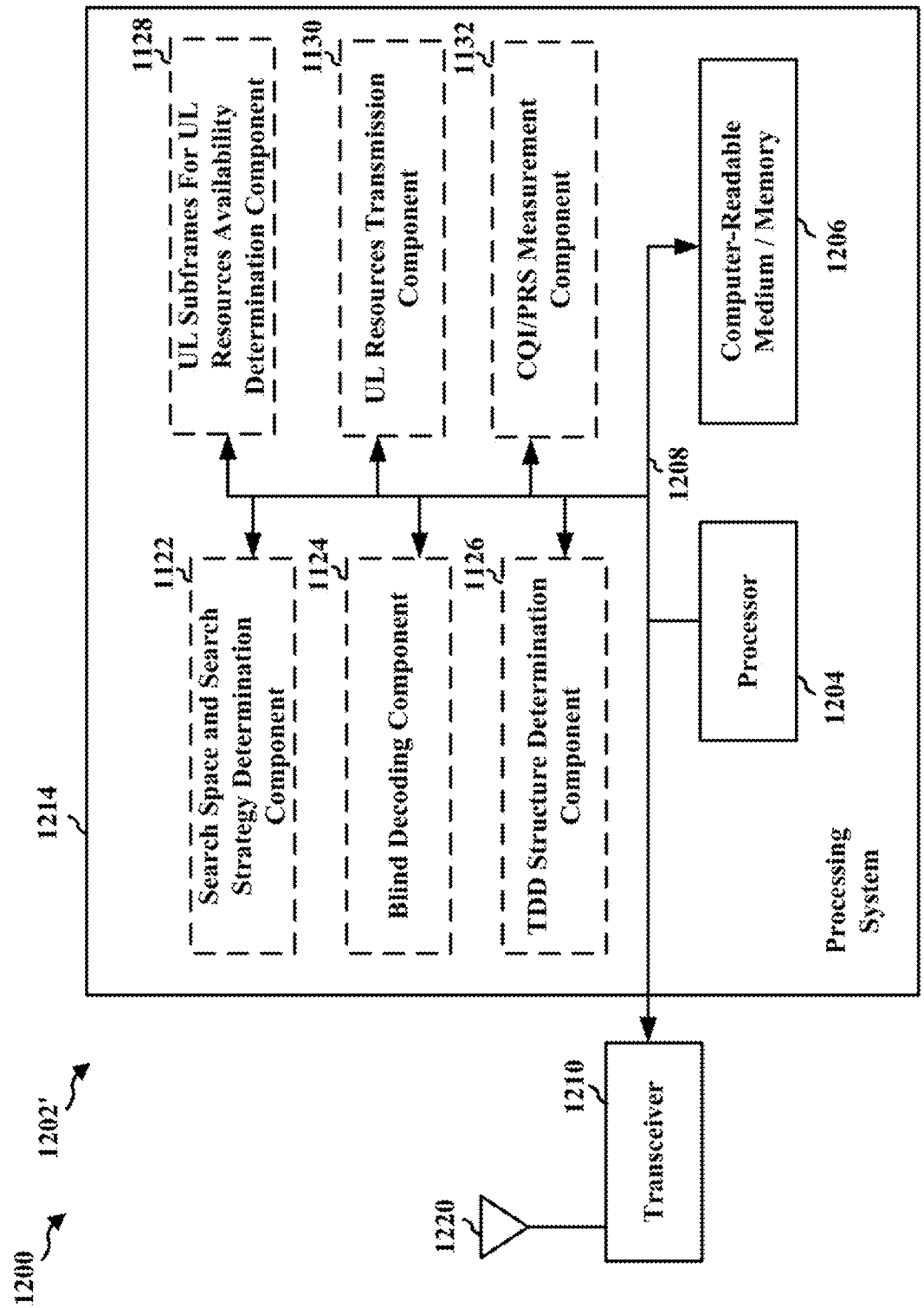
FIG. 12 is a diagram illustrating an example of a hardware implementation for an apparatus employing a processing system.

FIG. 12 is a diagram 1200 illustrating an example of a hardware implementation for an apparatus 1202' employing a processing system 1214. The processing system 1214 may be implemented with a bus architecture, represented generally by the bus 1208. The bus 1208 may include any number of interconnecting buses and bridges depending on the specific application of the processing system 1214 and the overall design constraints. The bus 1208 links together various circuits including one or more processors and/or hardware components, represented by the processor 1204, the components 1122, 1124, 1126, 1128, 1130, 1132, and the computer-readable medium/memory 1206. The bus 1208 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the blind decoding component 1124. In addition, the transceiver 1210 receives information from the processing system 1214, specifically the UL resources transmission component 1130, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system further includes at least one of the components 1122, 1124, 1126, 1128, 1130, and 1132. The components may be software components running in the processor 1204, resident/stored in the computer readable medium/memory 1206, one or more hardware components coupled to the processor 1204, or some combination thereof.

In one configuration, the apparatus 1202' may include means for receiving, from a base station, information about a time division duplex (TDD) frame structure of a plurality of frames and/or means for determining the TDD frame structure. The means to receive information about the TDD frame structure and/or means to determine the TDD frame structure may be implemented by the TDD structure determination component 1126. The plurality of frames includes a plurality of subframes. A plurality of UL subframes of the plurality of frames assigned for transmitting a plurality of UL resources associated with a control signaling is a function of the TDD frame structure. The apparatus 1202' may include means for determining a control channel search space within the plurality of subframes based on the information about the TDD frame structure of the plurality of frames. The apparatus 1202' may include means for determining a search strategy based on the control channel search space. The means for determining the control channel search space and the search strategy may be implemented by the search space and search strategy determination component 1122. The apparatus 1202' may include means for performing a blind decoding of the control channel search space with the search strategy to obtain control information. The means for the blind decoding may be implemented by the blind decoding component 1124.

In one configuration, the apparatus 1202' may include means for determining a location of a scheduled UL resource within the TDD frame structure for communicating a type of control signaling. The control signaling may include a random access channel, a uplink control channel, a SRS, or a SR. The apparatus 1202' may include means for determining if the location of the scheduled UL resource for communicating a type of the control signaling occurs on one of the plurality of UL subframes assigned for transmitting the scheduled UL resource. The means for determining the availability of the UL subframes for the scheduled UL resources for communicating the control signaling associated with the scheduled UL resources may be implemented by the UL subframes for UL resources availability determination component 1128. The apparatus 1202' may include means for communicating a type of the control signaling using the scheduled UL resource over one of the plurality of UL subframes when the location of the scheduled UL resource for communicating the type of the control signaling occurs on one of the plurality of UL subframes assigned for transmitting the scheduled UL resource. The means for communicating the control signaling may be implemented by the UL resources transmission component 1130. The apparatus 1202' may include means for determining a number of DL subframes of the plurality of frames over which to measure a CQI or a PRS based on the TDD frame structure and means for measuring the CQI or the PRS over the determined number of DL subframes. The means for the CQI/PRS measurement may be implemented by the CQI/PRS measurement component 1132. Any of the aforementioned means may be one or more of the processing system 1214 of the apparatus 1202' configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
    receiving a configuration of a time division duplex (TDD) frame structure for a plurality of frames, wherein the plurality of frames include a plurality of uplink (UL) periods and a plurality of downlink (DL) periods;
    transmitting a periodic control signaling instance if the periodic control signaling instance is scheduled during the UL periods of the TDD frame structure, wherein the periodic control signaling instance is scheduled periodically and the periodic control signaling includes at least one of a random access channel, an uplink control channel, a sounding reference signal (SRS), or a scheduling request (SR);
    measuring at least one of a channel quality indicator (CQI) or a positioning reference signal (PRS) using DL subframes, wherein CQI or PRS measurements are not transmitted in response to an UL subframe unassigned to periodic control signaling resources; and
    skipping transmission of the periodic control signaling instance in response to the periodic control signaling instance being scheduled to occur during a DL period, wherein the periodic control signing resources are unavailable.

2. The method of claim 1, wherein the transmitting of the periodic control signaling instance comprises transmitting at least one of the random access channel, the uplink control channel, the SRS, or the SR on one of the plurality of UL periods assigned for transmitting an UL resource.

3. The method of claim 1, further comprising transmitting a periodic channel state information (P-CSI) on one of the plurality of UL periods assigned for transmitting an UL resource associated with the at least one of the random access channel, the uplink control channel, the SRS, or the SR.

4. The method of claim 1, further comprising:
    determining a number of DL periods of the plurality of frames over which to average for a channel quality measurement based on the TDD frame structure;
    measuring and averaging the CQI over the determined number of DL periods; and
    transmitting the CQI on one of the plurality of UL periods assigned for transmitting an UL resource associated with the at least one of the random access channel, the uplink control channel, the SRS, or the SR.

5. The method of claim 1, further comprising:
    determining a number of DL periods of the plurality of frames over which to measure the PRS based on the TDD frame structure;

measuring the PRS over the determined number of DL periods to generate a PRS measurement; and transmitting the PRS measurement on one of the plurality of UL periods assigned for transmitting an UL resource associated with the at least one of the random access channel, the uplink control channel, the SRS, or the SR.

6. The method of claim 1, further comprising receiving information indicating a change in the TDD frame structure for a second set of frames that follow the plurality of frames.

7. An apparatus for wireless communication, comprising:
a processing system, configured to:
  receive a configuration of a time division duplex (TDD) frame structure for a plurality of frames, wherein the plurality of frames include a plurality of uplink (UL) periods and a plurality of downlink (DL) periods;
  transmit a periodic control signaling instance if the periodic control signaling instance is scheduled during the UL periods of the TDD frame structure, wherein the periodic control signaling instance is scheduled periodically and the periodic control signaling includes at least one of a random access channel, an uplink control channel, a sounding reference signal (SRS), or a scheduling request (SR);
  measure at least one of a channel quality indicator (CQI) or a positioning reference signal (PRS) using DL subframes, wherein CQI or PRS measurements are not transmitted in response to an UL subframe unassigned to periodic control signaling resources; and
  skip transmission of the periodic control signaling instance in response to the periodic control signaling instance being scheduled to occur during a DL period, wherein the periodic control signaling resources are unavailable.

8. The apparatus of claim 7, wherein the processing system is configured to transmit the periodic control signaling instance by being configured to transmit at least one of the random access channel, the uplink control channel, the SRS, or the SR on one of the plurality of UL periods assigned for transmitting an UL resource.

9. The apparatus of claim 7, wherein the processing system is further configured to transmit a periodic channel state information (P-CSI) on one of the plurality of UL periods assigned for transmitting an UL resource associated with the at least one of the random access channel, the uplink control channel, the SRS, or the SR.

10. The apparatus of claim 7, wherein the processing system is further configured to:
  determine a number of DL periods of the plurality of frames over which to average for a channel quality measurement based on the TDD frame structure;
  measure and average the CQI over the determined number of DL periods; and
  transmit the CQI on one of the plurality of UL periods assigned for transmitting an UL resource associated with the at least one of the random access channel, the uplink control channel, the SRS, or the SR.

11. The apparatus of claim 7, wherein the processing system is further configured to:
  determine a number of DL periods of the plurality of frames over which to measure the PRS based on the TDD frame structure;
  measure the PRS over the determined number of DL periods to generate a PRS measurement; and
  transmit the PRS measurement on one of the plurality of UL periods assigned for transmitting an UL resource associated with the at least one of the random access channel, the uplink control channel, the SRS, or the SR.

12. The apparatus of claim 7, wherein the processing system is further configured to receive information indicating a change in the TDD frame structure for a second set of frames that follow the plurality of frames.

13. An apparatus for wireless communication, comprising:
  means for receiving a configuration of a time division duplex (TDD) frame structure for a plurality of frames, wherein the plurality of frames include a plurality of uplink (UL) periods and a plurality of downlink (DL) periods;
  means for transmitting a periodic control signaling instance if the periodic control signaling instance is scheduled during the UL periods of the TDD frame structure, wherein the periodic control signaling instance is scheduled periodically and the periodic control signaling includes at least one of a random access channel, an uplink control channel, a sounding reference signal (SRS), or a scheduling request (SR);
  means for measuring at least one of a channel quality indicator (CQI) or a positioning reference signal (PRS) using DL subframes, wherein CQI or PRS measurements are not transmitted in response to an UL subframe unassigned to periodic control signaling resources; and
  means for skipping transmission of the periodic control signaling instance in response to the periodic control signaling instance being scheduled to occur during a DL period, wherein the periodic control signaling resources are unavailable.

14. The apparatus of claim 13, wherein the means for transmitting the periodic control signaling instance is further configured to transmit at least one of the random access channel, the uplink control channel, the SRS, or the SR on one of the plurality of UL periods assigned for transmitting an UL resource.

15. The apparatus of claim 13, wherein the means for transmitting the periodic control signaling is further configured to transmit a periodic channel state information (P-CSI) on one of the plurality of UL periods assigned for transmitting an UL resource associated with the at least one of the random access channel, the uplink control channel, the SRS, or the SR.

16. The apparatus of claim 13, wherein the means for determining the TDD frame structure of the plurality of frames is further configured to determine a number of DL periods of the plurality of frames over which to average for a channel quality measurement based on the TDD frame structure, wherein the apparatus further comprises means for measuring and averaging the CQI over the determined number of DL periods, and wherein the means for communicating the periodic control signaling is further configured to transmit the CQI on one of the plurality of UL periods assigned for transmitting an UL resource associated with the at least one of the random access channel, the uplink control channel, the SRS, or the SR.

17. The apparatus of claim 13, wherein the means for determining the TDD frame structure of the plurality of frames is further configured to determine a number of DL periods of the plurality of frames over which to measure the PRS based on the TDD frame structure, wherein the apparatus further comprises means for measuring the PRS over the determined number of DL periods to generate a PRS measurement, and wherein the means for communicating the periodic control signaling is further configured to transmit the PRS measurement on one of the plurality of UL periods assigned for transmitting an UL resource associated with the at least one of the random access channel, the uplink control channel, the SRS, or the SR.

18. The apparatus of claim 13, wherein the means for determining the TDD frame structure of the plurality of frames is further configured to receive information indicating a change in the TDD frame structure for a second set of frames that follow the plurality of frames.

19. A non-transitory computer-readable medium storing computer executable code, the code, when executed by a processor, to cause the processor to:
 receive a configuration of a time division duplex (TDD) frame structure for a plurality of frames, wherein the plurality of frames include a plurality of uplink (UL) subframes and a plurality of downlink (DL) subframes;
 transmit a periodic control signaling instance if the periodic control signaling instance is scheduled during the UL periods of the TDD frame structure, wherein the periodic control signaling instance is scheduled periodically and the periodic control signaling includes at least one of a random access channel, an uplink control channel, a sounding reference signal (SRS), or a scheduling request (SR);
 measure at least one of a channel quality indicator (CQI) or a positioning reference signal (PRS) using DL subframes, wherein CQI or PRS measurements are not transmitted in response to an UL subframe unassigned to periodic control signaling resources; and
 skip transmission of the periodic control signaling instance in response to the periodic control signaling instance being scheduled to occur during a DL period, wherein the periodic control signaling resources are unavailable.

* * * * *